United States Patent
Tone

(10) Patent No.: US 6,404,512 B1
(45) Date of Patent: Jun. 11, 2002

(54) METHOD AND APPARATUS FOR IMAGE PROCESSING CAPABLE OF EFFICIENTLY PERFORMING A GAMMA CONVERSION OPERATION

(75) Inventor: Takeharu Tone, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/348,631

(22) Filed: Jul. 6, 1999

(30) Foreign Application Priority Data

Jul. 6, 1998 (JP) ............................................ 10-190811

(51) Int. Cl.$^7$ ............................. B41B 15/00; G03F 3/08
(52) U.S. Cl. ...................... 358/3.01; 358/518; 358/519; 345/690; 348/674
(58) Field of Search ................................ 358/1.9, 1.16, 358/448, 518, 519, 521, 523, 524, 534; 348/254, 256, 671, 674, 675; 345/87, 597, 598, 599, 690

(56) References Cited

U.S. PATENT DOCUMENTS 5,706,058 A * 1/1998 Okada ........................ 348/674
6,160,532 A * 12/2000 Kaburagi et al. ............ 348/674
6,292,165 B1 * 9/2001 Lin et al. .................... 348/674

OTHER PUBLICATIONS

U.S. Ser. No. 09/262,317, filed Mar. 4, 1999, pending.

* cited by examiner

Primary Examiner—Kimberly A. Williams
(74) Attorney, Agent, or Firm—Oblon, Spivak, McClelland, Maier & Neustadt, P.C.

(57) ABSTRACT

An image processing method and apparatus including a memory, parameter registers, and a gamma conversion processor. The memory stores at least one gamma conversion algorithm and a plurality of parameter sets corresponding to predefined gray-scale ranges. The gamma conversion processor selects a suitable parameter set from among the plurality of parameter sets according to a required output gray-scale range and transfers the selected suitable parameter set from the memory to the parameter registers sequentially. Then, the gamma conversion processor performs at a time in parallel a gamma conversion operation with respect to input gray-scale values of successive pixels of an input image data stream using the gamma conversion algorithm and the selected suitable parameter set, and generates a serial output gray-scale signal based on a result of the gamma conversion operation and the data stored in the parameter registers.

24 Claims, 16 Drawing Sheets

METHOD AND APPARATUS FOR IMAGE PROCESSING CAPABLE OF EFFICIENTLY PERFORMING A GAMMA CONVERSION OPERATION

CROSS REFERENCE TO RELATED APPLICATIONS

This application claims priority under 35 USC §119 to Japanese patent application JPAP10-190811 filed Jul. 6, 1998, the entire contents of which is incorporated herein by reference.

BACKGROUND OF THE INVENTION

1. Field of the Invention

The present invention generally relates to a method and apparatus for image processing, and more particularly to a method and apparatus for image processing which efficiently performs a gamma conversion operation using a digital signal processor (DSP).

2. Discussion of the Background

An image processing apparatus such as a copier machine scans a document sheet placed on a contact glass thereof and performs opto-electrical conversion on each scanned line. The obtained image signal is converted into a digital signal, which is then subjected to image processing to generate a recording signal. The image processing apparatus uses this recording signal to modulate laser light emitted from a laser device, thereby forming a latent image on a photo-sensitive body. This latent image corresponds to the original document image.

The image processing performed during the above operation includes such processes as color correction, gamma correction, shading correction, MTF correction, gray-scale correction, size enlargement/reduction process, etc.

Conventional image processing apparatuses conduct gamma correction by using a look-up table stored in a memory. Namely, a look-up table, which lists output levels corresponding to input levels over the entire gray-scale range, is stored in an external memory, and an input address representing an input level is supplied to read a corresponding output level from the memory. An input-to-output relation between the input levels and the output levels can be drawn as a characteristic curve on a graph, which is generally referred to as a gamma curve.

The memory may need to store more than one look-up table, i.e., more than one relation between input levels and the output levels. Such a plurality of gamma curves may become necessary when the copier machine is provided with a function to select a desired image density from a plurality of image density levels for printing images, for example. This adds to memory space required for storing the look-up tables.

In some configurations where an image memory is shared by different apparatuses, separate gamma corrections may become necessary for a scanner and for a printer, for example. This also adds to the memory space for the look-up tables. Also, when there is a need to change gamma curves, all the entries in the look-up tables have to be rewritten.

In this manner, the scheme which stores gamma curves as look-up tables requires a relatively large memory space to store a large data set and lacks flexibility in changing gamma curves.

Accordingly, there is a need for an image processing apparatus which can reduce the size of the stored data set required for gamma correction and allows the gamma curves to be easily modified.

SUMMARY OF THE INVENTION

Accordingly, one object of the present invention is to provide a novel image processing apparatus which efficiently performs a gamma conversion operation.

Another object is to provide a novel method of image processing which efficiently performs a gamma conversion operation.

To achieve these and other objects, the present invention provides a novel image processing apparatus which includes a memory, a plurality of parameter registers, and a gamma conversion processor. The memory has stored therein at least one gamma conversion algorithm and a plurality of parameter sets corresponding to predefined gray-scale ranges. The gamma conversion processor selects a suitable parameter set from among the plurality of parameter sets stored in the memory according to a required output gray-scale range, and transfers the selected suitable parameter set from the memory to the parameter registers sequentially during a gamma conversion operation. Then, the gamma conversion processor performs at a time in parallel the gamma conversion operation with respect to input gray-scale values of successive pixels of an input image data stream using the at least one gamma conversion algorithm stored in the memory and the selected suitable parameter set sequentially stored in the parameter registers, and generates a serial output gray-scale signal based on a result of the gamma conversion operation.

The image processing apparatus may includes a gray-scale range controller which determines the required output gray-scale range.

The present inventions provides another novel image processing apparatus includes a re-programmable memory, a gray-scale range controller, a plurality of parameter registers, a plurality of calculators, and a gamma conversion processor. The re-programmable memory previously stores a gamma conversion algorithm and a plurality of parameter set groups corresponding to a plurality of predefined gray-scale ranges. Each of the parameter set groups includes a plurality of parameter sets corresponding to a plurality of predefined gray-scale segment numbers. The gray-scale range controller determines a required output gray-scale range. The plurality of calculators are provided corresponding to a plurality of successive pixels in a raster of an input image data stream. Each of the calculators performs a gamma conversion operation with respect to one pixel. The gamma conversion processor determines a gray-scale segment number according to an input gray-scale range and divides the input gray-scale range accordingly into the determined gray-scale segment number. The gamma conversion processor selects a suitable parameter set from among the plurality of parameter sets stored in the re-programmable memory according to the required output gray-scale range determined by the gray-scale range controller and the determined gray-scale segment number and sequentially transfers the selected suitable parameter set from the re-programmable memory to the parameter registers during a gamma conversion operation. Then, the gamma conversion processor causes the plurality of calculators to perform at a time in parallel the gamma conversion operation with respect to the input gray-scale ranges of successive pixels of an input image data stream using the gamma conversion algorithm and the selected suitable parameter set stored in the parameter registers, and generates a serial output gray-scale signal based on a result of the gamma conversion operation.

Each of the plurality of parameter sets may include a predefined gray-scale segment number and combinations of values of x- and y-coordinates and a value of a slope for respective gray-scale segments in a corresponding gray-scale range.

The re-programmable memory may include a plurality of different gray-scale segment numbers corresponding to a plurality of different gray-scale ranges, and the gamma conversion processor may determine the gray-scale segment number by selecting one of the plurality of different gray-scale segment numbers according to the required output gray-scale range determined by the gray-scale range controller.

The re-programmable memory may be connected to an external computer and previously store a gamma conversion algorithm and one parameter set corresponding to one predefined gray-scale range, and a predefined gray-scale segment number, the one parameter set including a plurality of parameters corresponding to a predefined gray-scale segment number. The apparatus may further includes a selector for selecting one of a connection of the re-programmable memory within the apparatus and a connection between the re-programmable memory and the external computer. In this case, the external computer causes the selector to select the connection between the re-programmable memory and the external computer, and changes contents of the one parameter set and the predefined gray-scale segment number in response to a required output gray-scale range determined by the gray-scale range controller.

The image processing apparatus may further includes a display and data entry unit which is connected to the external computer and the re-programmable memory. In this case, the contents of the one parameter set and the predefined gray-scale segment number are changed through the display and data entry unit.

The display and data entry unit may read the contents of the one parameter set and the predefined gray-scale segment number from the re-programmable memory and indicate the read contents thereon.

Also, the present invention provides a method of image processing which includes the steps of storing, establishing, providing, determining, dividing, selecting, transferring, causing, and generating. The storing step previously stores a gamma conversion algorithm and a plurality of parameter set groups corresponding to a plurality of predefined gray-scale ranges. Each of the parameter set groups includes a plurality of parameter sets corresponding to a plurality of predefined gray-scale segment numbers into a re-programmable memory. The establishing step establishes a required output gray-scale range. The providing step provides a plurality of calculator corresponding to a plurality of successive pixels in a raster of an input image data stream. Each of the calculators capable of performing a gamma conversion operation with respect to one pixel. The determining step determines a gray-scale segment number according to an input gray-scale range. The dividing step divides the input gray-scale range accordingly into the determined gray-scale segment number. The selecting step selects a suitable parameter set from among the plurality of parameter sets stored in the re-programmable memory according to the required output gray-scale range established in the established step and the determined gray-scale segment number. The transferring step sequentially transfers the selected suitable parameter set from the re-programmable memory to a plurality of parameter registers during a gamma conversion operation. The causing step causes the plurality of calculators to perform at a time in parallel the gamma conversion operation with respect to the input gray-scale ranges of successive pixels of an input image data stream using the gamma conversion algorithm and the selected suitable parameter set stored in the parameter registers. The generating step generates a serial output gray-scale signal based on a result of the gamma conversion operation.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
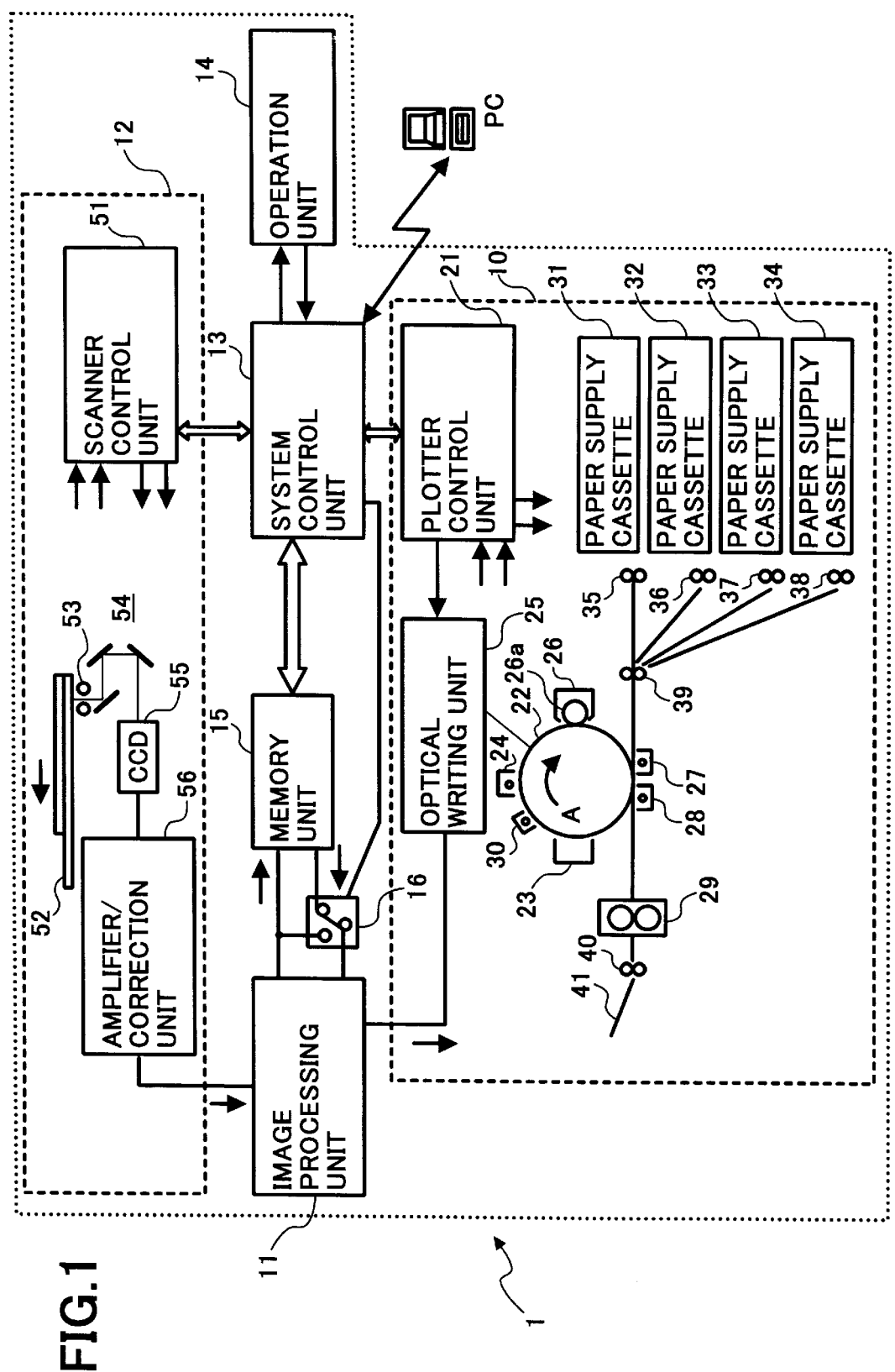
FIG. 1 is a schematic block diagram of an exemplary digital copying machine as an embodiment of an image processing apparatus according to the present invention.

In describing the preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a digital copying apparatus 1 according to an embodiment of the present invention. The digital copying apparatus 1 of FIG. 1 includes an image forming unit 10, an image processing unit 11, a scanning unit 12, a system control unit 13, an operation unit 14, a memory unit 15, and a selector unit 16.

The image forming unit 10 includes a plotter control unit 21, a photosensitive drum 22, a cleaner 23, an electric charge unit 24, an optical writing unit 25, a development unit 26, a transfer charger 27, a separation charger 28, a fixing unit 29, a discharge unit 30, paper supply cassettes 31–34, conveyor rollers 35–38, registration rollers 39, a paper ejection rollers 40, and a paper ejection tray 41.

The plotter control unit 21 operates under the control of the system control unit 13 and attends to control of overall operations of the image forming unit 10.

The photosensitive drum 22 includes photosensitive material on a surface thereof The electric charger unit 24 electrically charges the photosensitive drum 22 to a predetermined voltage level. The optical writing unit 25 operates under the control of the plotter control unit 21 and scans a laser beam on the surface of the photosensitive drum 22. The development unit 26 develops an electrostatic latent image formed on the photosensitive drum 22 so as to create a toner image. The transfer charger 27 transfers the toner image from the surface of the photosensitive drum 22 to a paper sheet of when the sheet of paper comes between the photosensitive drum 22 and the transfer charger 27. The separation charger 28 separates the sheet of paper from the photosensitive drum 22. The fixing unit 29 includes a pressure exerting roller and a heat applying roller to fix the toner image on the sheet of paper.

The paper supply cassettes 31–34 supply sheet of paper and may be detachable from the digital copying apparatus 1. The conveyor rollers 35–38, the registration rollers 39, and the paper ejection rollers 40 convey a paper sheet along a paper sheet path. The paper ejection tray 41 receives paper sheets as they are ejected by the fixing unit 29.

The scanning unit 12 includes a scanner control unit 51, a contact glass 52, scan lamps 53, mirrors 54, a CCD (charge coupled device) camera 55, and an amplifier/correction unit 56.

The scanner control unit 51 operates under the control of the system control unit 13 and controls overall operations of the scanning unit 12.

A document sheet is placed on the contact glass 52 to be scanned by light as the scan lamps 53 emit the light. Light reflected by the document sheet is directed to the CCD camera 55 via an arrangement of the mirrors 54. The CCD camera 55 converts the optical image into an image signal. The image signal is then supplied to the amplifier/correction unit 56, which attends to amplification, analog-to-digital conversion, and shading correction of the image signal.

The image processing unit 11 performs image processing on the image signal supplied from the scanning unit 12 and supplies the processed image signal to the image forming unit 10. The image processing unit 11 operates based on programs stored in the memory unit 15. The memory unit 15 stores various kinds of data including parameters used for image processing operations, in addition to the programs used by the image processing unit 11. These parameters and programs in the memory unit 15 may be written, changed, and deleted by the system control unit 13 which controls the entire operations of the digital copying apparatus 1.

The selector unit 16 is activated by the system control unit 13 to select a path for the scan data from the scanning unit 12. Through one selectable path, the scan data is transferred to the memory unit 15 via the image processing unit 11 and is stored therein. After that, the scan data is forwarded to the optical writing unit 25 via the image processing unit 11 so as to be used in the optical writing operation performed by the optical writing unit 25. Through the other selectable path, the scan data is directly forwarded to the optical writing unit 25 via the image processing unit 11.

The operation unit 14 allows a user to access the system control unit 13 to operate the digital copying apparatus 1. A personal computer PC may be connected to the system control unit 13 so as to conduct two-way communication therewith and to control the operation of the digital copying apparatus 1.

The photosensitive drum 22 of the image forming unit 10 rotates in a direction shown by an arrow upon a start of an operation for printing the processed image signal and is charged up to a predetermined voltage level by the electric charge unit 24. The optical writing unit 25 emits a laser beam modulated in accordance with the processed image signal under the control of the plotter control unit 21 and scans the laser beam on the photosensitive drum 22 electrically charged at the predetermined voltage level. This creates an electrostatic latent image on the photosensitive drum 22. In association with the rotation of the photosensitive drum 22, the development unit 26 creates a thin layer of toner on a development roller 26a and selectively applies the toner to the electrostatic latent image on the photosensitive drum 22. This develops the electrostatic latent image and creates a toner image on the photosensitive drum 22.

Upon a start of this operation to create the toner image on the photosensitive drum 22, one of the paper supply roller 35–38 starts rotating, so that a sheet of paper is taken out from one of the paper supply cassettes 31–34. This paper sheet is conveyed along the paper sheet path and makes a temporal stop when a front end of the paper sheet touches the registration rollers 39. The registration rollers 39 resume the conveyer operation when a front end of the toner image on the photosensitive drum 22 reaches a predetermined position. The transfer charger 27 transfers the toner image from the photosensitive drum 22 to the paper sheet.

The paper sheet having the toner image thereon is separated from the photosensitive drum 22 by the separation charger 28 and is supplied to the fixing unit 29. The fixing unit 29 applies heat to the toner image while pressure is applied, thereby fixing the toner image on the paper sheet. The paper sheet is ejected by the paper ejection rollers 40 and is stacked on the paper ejection tray 41.

Figure 2:
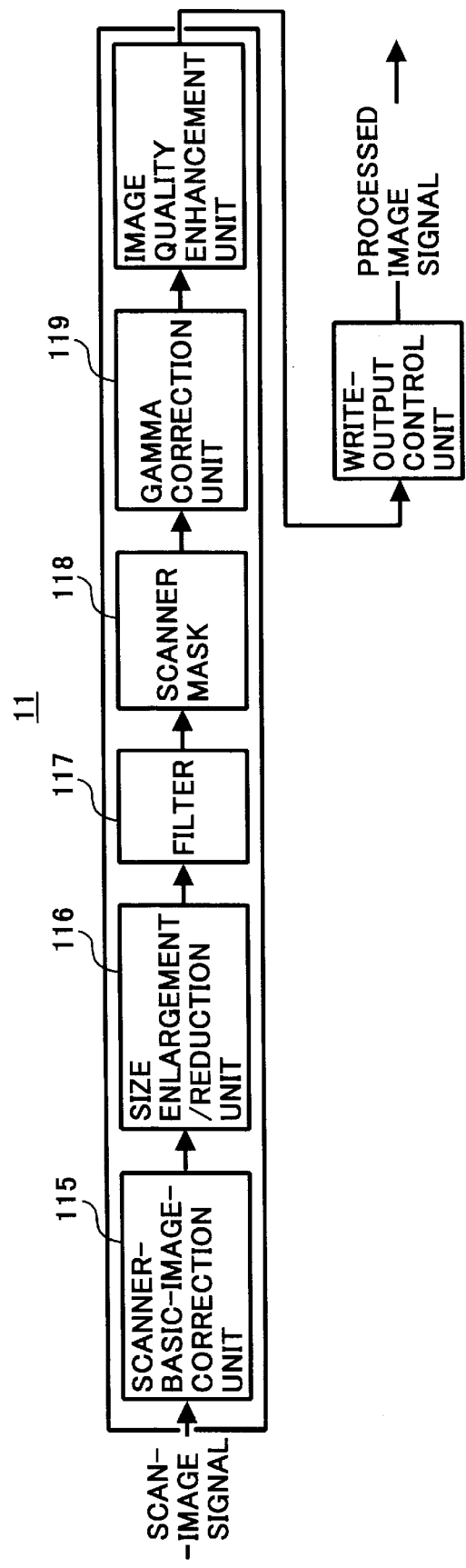
FIG. 2 is a block diagram of an image processing unit included in the copying machine of FIG. 1.

Referring to FIG. 2, the image processing unit 11 includes a scanner-basic-image-correction unit 115, a size enlargement/reduction unit 116, a filter 117, a scanner mask 118, a gamma correction unit 119, an image quality enhancement unit 120, and a write-output control unit 121. The scanner-basic-image-correction unit 115 performs such processes as color correction, shading correction, MTF (modulation transfer function) correction, gray-scale conversion, etc. The size enlargement/reduction unit 116 attends to size enlargement/reduction of an image. The filter unit 117 serves to apply a filter operation, and the scanner mask 118 is used for masking operations. The gamma correction unit 119 applies gamma correction to remove device-specific characteristics of the scanning unit 12 and the image forming unit 10. The image quality enhancement unit 120 attends to image processing for improving image quality. The write-output control unit 121 controls outputting of a processed image signal to the image forming unit 10.

Various programs for processing images as described above are stored in the memory unit 15 of FIG. 1.

Figure 3:
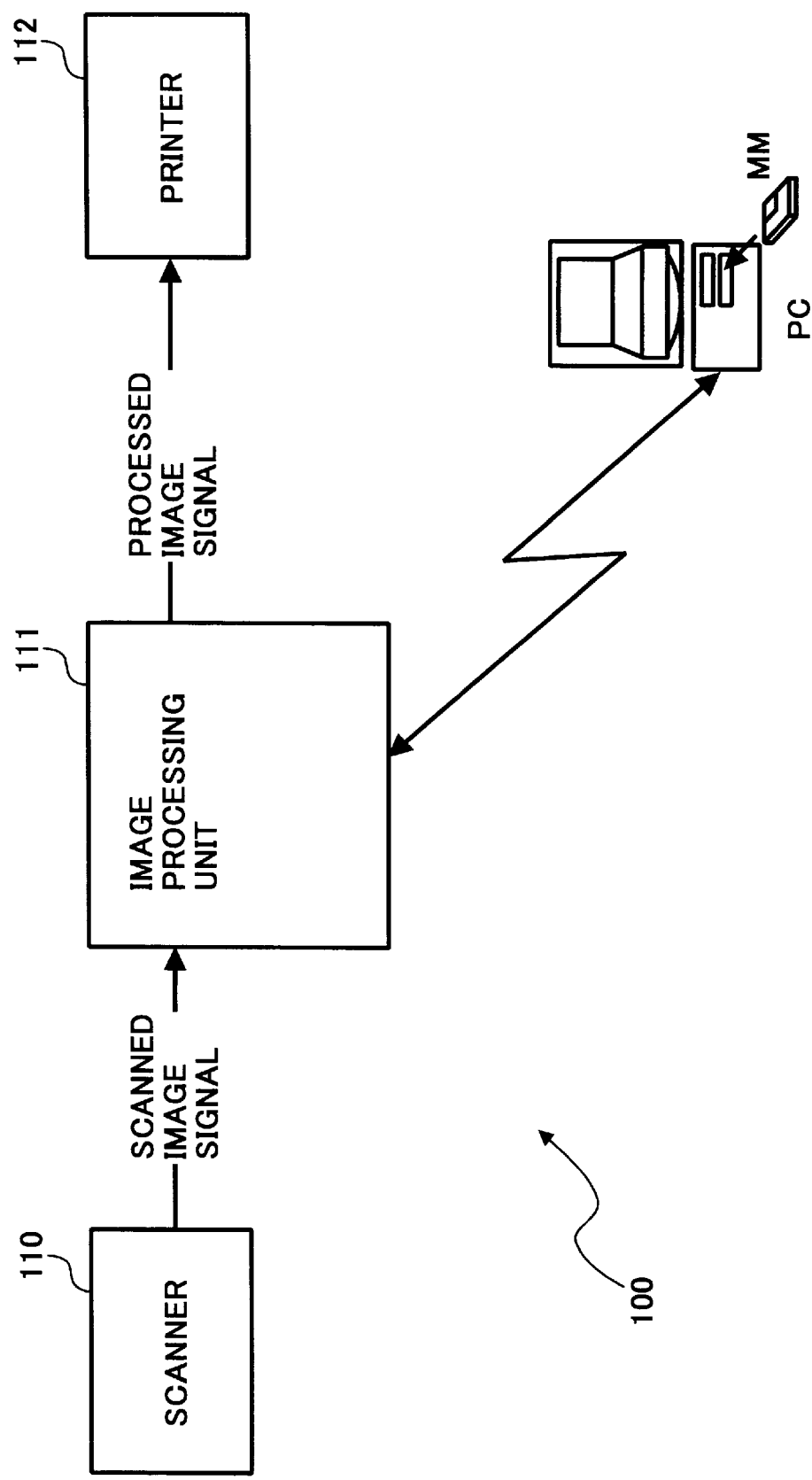
FIG. 3 is a block diagram of another embodiment of the image processing apparatus according to the present invention.

Referring to FIG. 3, another example of a digital copying apparatus 100 as another embodiment of an image processing apparatus according to the present invention is explained. The digital copying apparatus 100 of FIG. 3 includes a scanner 110, an image processing unit 111, a printer 112, and a personal computer PC.

When the digital copying apparatus 100 of FIG. 3 operates as a digital copying machine, for example, the scanner 110 scans a document sheet placed on the contact glass thereof and performs opto-electrical conversion on each scanned line. The obtained image signal is converted into a digital signal, which is then subjected to image processing by the image processing unit 111 to generate a processed image signal. The processed image signal is supplied to the printer 112. The printer 112 uses the processed image signal to modulate laser light of a laser device and to form a latent image on a photo-sensitive body. This latent image corresponds to the original document image and is transferred to a sheet of paper to form a permanent image on the sheet of paper.

The image processing unit 11 is controlled by the personal computer PC, which is connected to the image processing unit 111 to conduct a two-way communication therewith. The image processing unit 111 basically has the same configuration as that of image processing unit 11 shown in FIG. 2.

Programs for processing images in the image processing unit 111 may be provided in the form of memory medium MM, e.g., a floppy disk. The programs recorded in the memory medium MM, e.g., a floppy disk, is loaded into the memory of the personal computer PC to control the operation of the image processing unit 111.

The image processing unit of FIG. 2 (the image processing unit 11 of FIG. 1 or the image processing unit 111 of FIG. 3) uses a digital signal processor (DSP). In an image processing operation, the DSP processor is configured to apply the same processing which is specified by the same instruction to a plurality of pixels simultaneously so as to effect parallel processing of an image. In the present invention, a gray-scale conversion such as a gamma correction is performed by a DSP processor.

In the following, an algorithm for a DSP processor to perform a gray-scale conversion will be described in detail with reference to a specific example in which a gamma correction is applied to an image. Also, in the following, the DSP processor is referred to as a gamma correction device for the sake of convenience.

Figure 4:
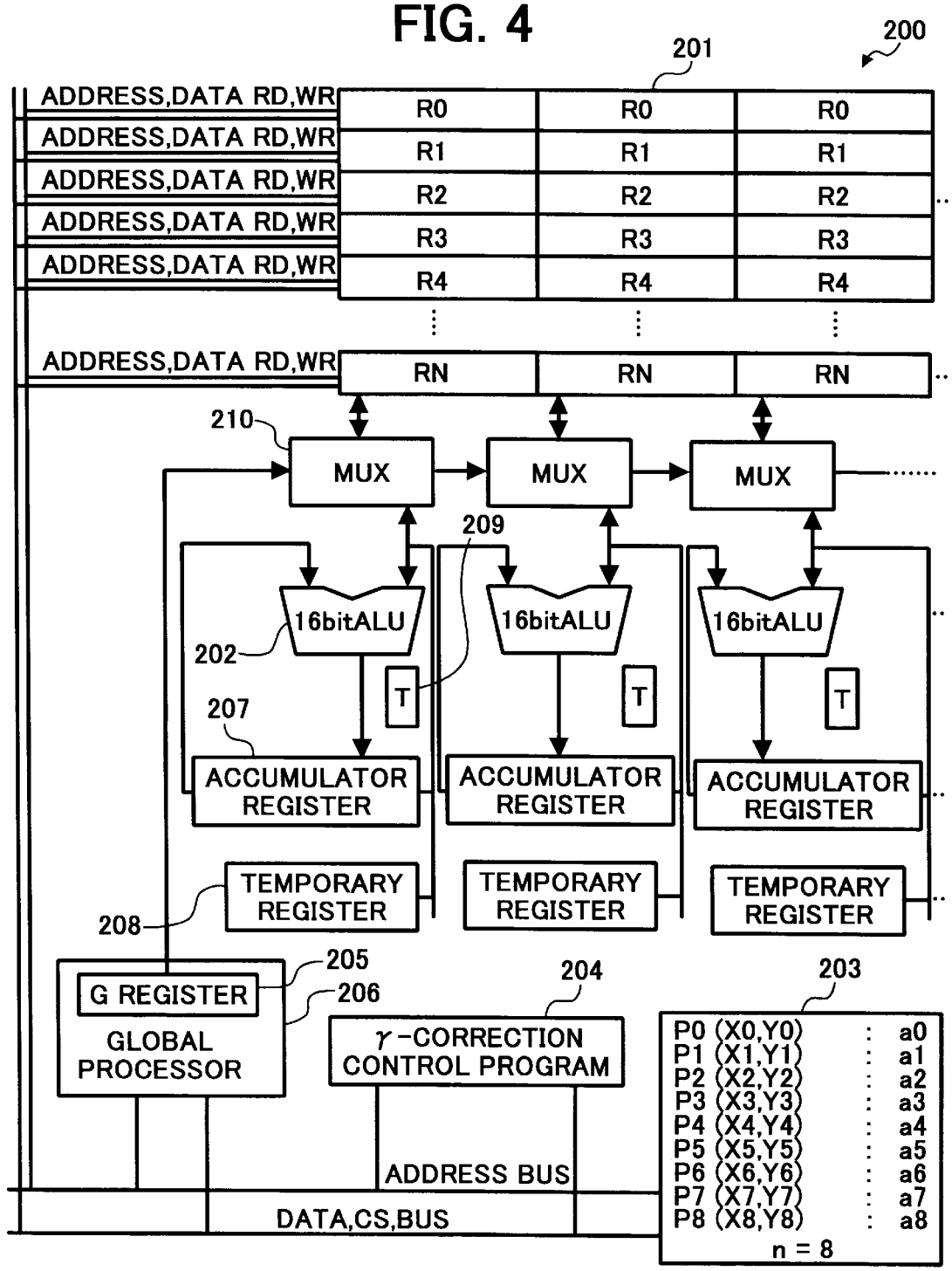
FIG. 4 is a block diagram of an exemplary digital signal processor (DSP) which performs a gamma correction of an image in the copying machine of FIG. 1.

Referring to FIG. 4, a configuration of a gamma correction device 200, which is included in the image processing unit 11 of FIG. 1 and the image processing unit 111 of FIG. 3, is explained. The gamma correction device 200 of FIG. 4 includes a plurality of registers 201, a plurality of ALUs (arithmetic/logic operation unit) 202, an external data RAM (random access memory) 203, a program RAM (random access memory) 204, a global register 205, a global processor 206, a plurality of accumulator registers 207, a plurality of temporary registers 208, a plurality of T registers 209, and a plurality of multiplexers 210. The registers 201 includes a set of a R0 register through a RN register for each image pixel to be processed. Also, the ALUs 202, the accumulator registers 207, the temporary registers 208, the T registers 209, and the multiplexers 210 are provided one each for every corresponding image pixel to be processed.

Each of the registers 201 stores 8-bit data, which may be part of image data supplied from an external source and may be supplied as output data to an external destination. Each of the multiplexers 210 selects data either from the global register 205 or from one of the R0 through RN registers 201 and supplies the selected data to a corresponding one of the ALUs 202. Each of the ALUs 202 applies a specified arithmetic or logic operation to the data supplied from the multiplexer 210 and data supplied from the accumulator register 207. Thereby, a 16-bit operation is performed.

The external data RAM 203 is actually not part of the DSP processor, but it is connected thereto to provide parameters necessary for calculation of gamma correction. The external data RAM 203 may be combined with the memory unit 15 of FIG. 1. The program RAM 204 stores a program for controlling the operation of the DSP processor to perform gamma correction. The global processor 206 controls an operation of each ALU 202 based on the same instruction so that all the ALUs 202 perform the same operation at the same time. The global register 205 is provided in the global processor 206 and stores data which is shared by the all ALUs 202.

Each of the ALUs 202 is provided with a corresponding accumulator register 207 which stores 16-bit data and a corresponding temporary register 208 which also stores 16-bit data. Each of the ALUs 202 applies a specified operation to the data supplied from one of the R0 through RN registers 201 and from the accumulator registers 207 and stores resulting data in the accumulator register 207. A corresponding one of the T registers 209 stores one bit data indicating whether the specified program operation is performed. The multiplexers 210 are also connected in series to output the resulting data to an external destination in a serial manner.

An ALU 202, an accumulator register 207, a temporary register 208, a T register 209, a multiplexer 210, and a set of R0 through RN registers 201 together form a processing element PE. A plurality of processing elements PE are arranged in parallel and operates in the same manner according to the same program. Each processing element PE attends to data processing of one pixel. The processing elements PE of the DSP processor may together process data of one raster line of an image in this embodiment.

The R0 through R5 registers 201 store input gray-scale data, x-coordinate data, y-coordinate data, coefficient data (i.e. slope data, stored as a fraction with the numerator in one register and the denominator in another), and output gray-scale data respectively, and the RN registers (segment registers) 201 store segment data. In the present invention, an output gray-scale level (i.e. gray-scale range) is calculated by the DSP of FIG. 4 from an input gray-scale level by using a linear conversion formula, for example, as follows:

$$\text{Output} = \text{int}\{a_n \times (\text{input} - x_n) + y_n\} \tag{1}$$

Namely, the gamma curve for converting input to output is divided into a plurality of segments of the input gray-scale levels, and a linear expression is used for approximating the gamma curve within each segment.

Figure 6:
FIG. 6 is a chart showing coordinate data and slope data which represent the gamma curve of FIG. 6A.
Figure 5:
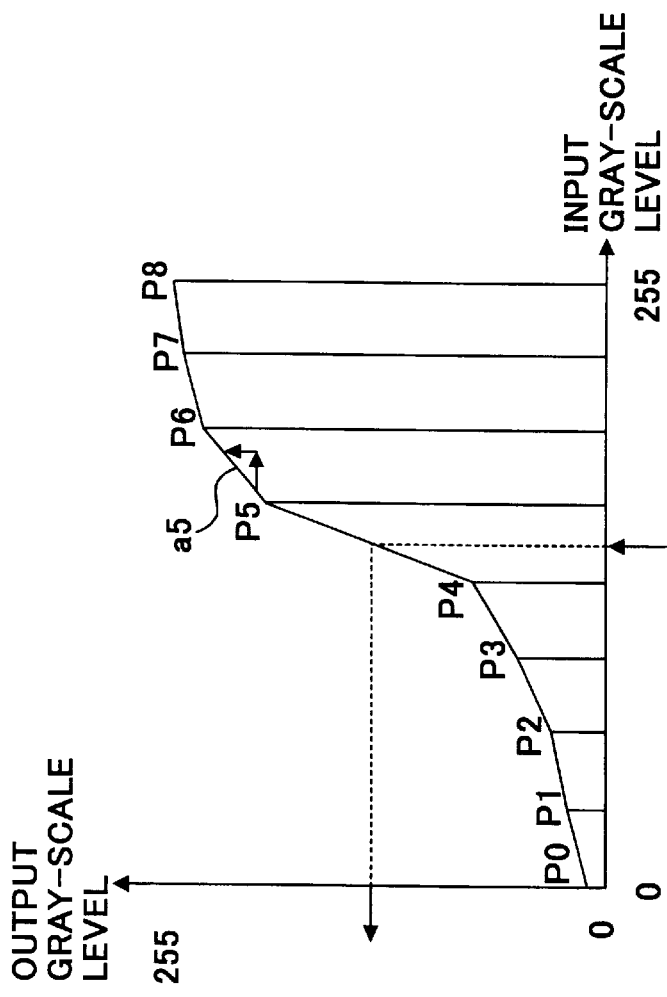
FIG. 5 is a graph showing an example of a gamma curve for converting input gray-scale levels to output gray-scale levels used in the DSP of FIG. 4.

An example of a gamma curve for converting input gray-scale levels to output gray-scale levels is illustrated in FIG. 5, and coordinate data and coefficient data (slope data) which represent the exemplary gamma curve of FIG. 5 is shown in FIG. 6. In FIG. 5, a point in a n-th segment is represented by a coordinate $P_n(x_n, y_n)$, and a corresponding line segment approximating for the gamma curve is represented by a slope $a_n$. It should be noted that the slope a is obtained as $(y_{n+1}-y_n)/(x_n-x_n)$. For example, a slope $a_5$ represents a slope between $P_4(x_4, y_4)$ and $P_5(x_5, y_5)$, as shown in FIG. 5. An output value of such a gamma conversion is represented as:

$$\text{Output}=a_n\times(\text{Input}-x_n)+y_n. \quad (2)$$

If the output is quantized into 256 gray-scale levels, the output gray-scale level is obtained as:

$$\text{Output}=\text{int}\{a_4\times(\text{Input}-x_4)+y_4\}, \quad (3)$$

based on the formula (1), where "int{*}" represents a rounding operation to round a real value to the nearest integer smaller than the real value. In this case, if the input gray-scale level having a value between P4 and P5 is processed, the output gray-scale level is obtained as:

$$\text{Output}=\text{int}\{a_4\times(\text{Input}-x_4)+y_4\}, \quad (4)$$

based on the formula (1) using the input coordinate data $P_4(x_4, y_4)$ and the slope $a_4$.

To use the segment-wise linear approximation described above, an algorithm should be advised to allow each processing element PE to calculate a linear approximation of a corresponding segment. As previously described, a processing element PE is assigned to each pixel. Since each pixel has a gray-scale level of its own, each processing element needs to calculate a linear approximation for a selected segment, which is likely to be different from processing element to processing element.

Referring to the flowchart of FIG. 7, a process of calculating a gamma conversion will be explained. At Step S1 of FIG. 7, input gray-scale levels are stored in the R0 registers. At Step S2, the T registers 209 are initialized to store "1." At the same time, segment data is loaded from the external data RAM 203 to the RN registers (segment registers). Each of the T registers 209 is a one-bit register, and an ALU 202 performs a specified operation only when a corresponding T register 209 stores "1." The segment data indicates the number of segments into which the input gray-scale levels are divided. If the gamma curve is divided into 8 segments, for example, the segment data is 8.

At Step S3, the number n stored in the segment register (RN register) is decreased by 1(i.e., n=n-1). As mentioned above, the segment registers initially store the total number of segments. This number is decreased by 1 each time the following operation is performed.

As Step S4, a check is made as to whether the value stored in the T register 209 of a given processing element PE is 1. If the value is 1, the procedure goes to Step S5 for this particular processing element PE. If the value is 0, the procedure goes to Step S9 for this particular processing element PE. That is, the following operation from Step S to Step S8 is performed only with respect to the processing elements PE that have the T registers 209 storing the value "1."

At Step S5, the x-coordinate data $x_{n-1}$ and the y-coordinate data $y_{n-1}$ of the point $P_{n-1}$ and the slope $a_{n-1}$, as the data after one subtraction operation relative to the n-th segment has been made, are loaded to the R1, R2, and R3 registers, respectively, from the external data RAM 203 via the global register 205.

At Step S6, the ALU of each pertinent processing element PE subtracts the x coordinate $x_{n-1}$ from the input gray-scale level stored in the R0 register.

At Step S7, the x-coordinate data $x_n$ and the y-coordinate data $y_{n-1}$ of the point $P_{n-1}$ are transferred to the R1 register and the R2 register, respectively, of each pertinent processing element PE. Further, the slope $a_{n-1}$ is transferred to the R3 register of each pertinent processing element PE.

At Step S8, a sign bit obtained as a result of the subtraction operation is stored in the T register 209 with respect to each pertinent processing element PE. The sign bit becomes 0 when the result of the subtraction operation is positive (i.e., greater than zero). Namely, a given T register 209 stores 1 when the input gray-scale level of a corresponding pixel is smaller than the x coordinate $x_n$ of the currently processing segment. In other words, the given T register 209 stores 1 when the input gray-scale level of the corresponding pixel falls within a segment for which the coordinate data, and the slope data has yet to be loaded.

At Step S9, a check is made as to whether the number n stored in the segment register is zero. If it is zero, the procedure goes to Step S10. If the check result at Step S9 is not zero, the procedure goes back to Step S3 to repeat Steps S3 through S8 for the next segment.

At Step S10, the output gray-scale level is calculated via int{R3*(Input-R1)-R2}. Here, R1 through R3 denote the contents of the R1 through R3 registers, respectively. Since, the R1 through R3 registers of a given processing element PE store the coordinate data and the slope data of a pertinent segment selected for a corresponding input gray-scale level, the above calculation achieve a proper segment-wise linear approximation.

At Step S11, the output gray-scale levels are output. This ends the procedure.

Referring to FIGS. 8–11, further details of the above operations will be described below. As shown in each of FIGS. 8–11, input gray-scale levels of three processing elements PE1 through PE3 are 240, 200, and 50, respectively. In this example, the input gray-scale levels range from 0 to 255, and this range is divided into 8 segments of equal intervals. FIGS. 8–11 show the way each register is updated at every turn with the coordinate data and the slope data stored in the external data RAM 203, using the procedure of FIG. 7.

It should be noted that the slope data in this example is given as a fraction which is represented by a denominator and numerator. The denominator is 32 and is stored in the R3 registers. The numerator is an integer and is stored in the R4 registers.

Figure 8:
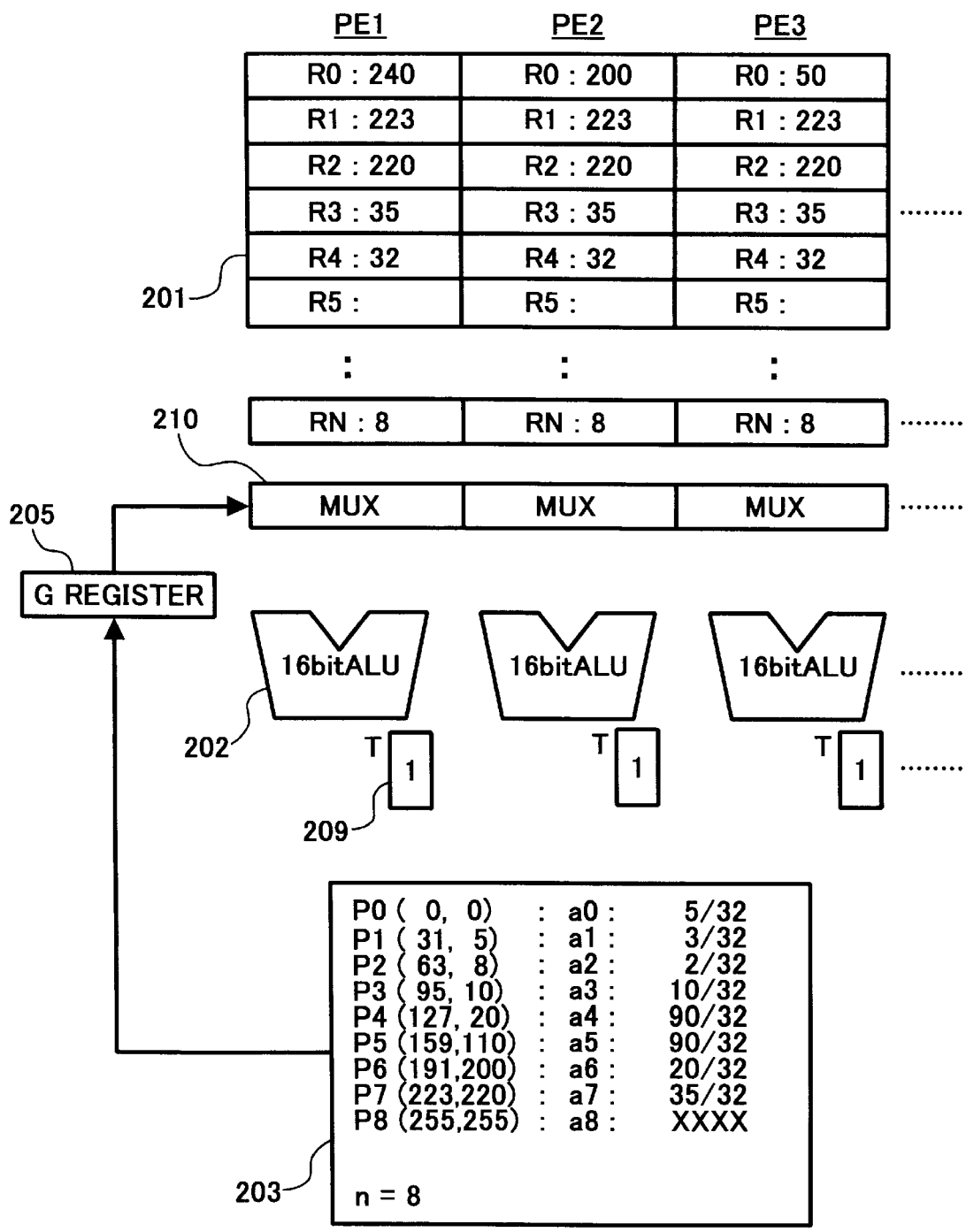
FIG. 8 is an illustration showing initial conditions of registers included in the DSP of FIG. 4.
Figure 9:
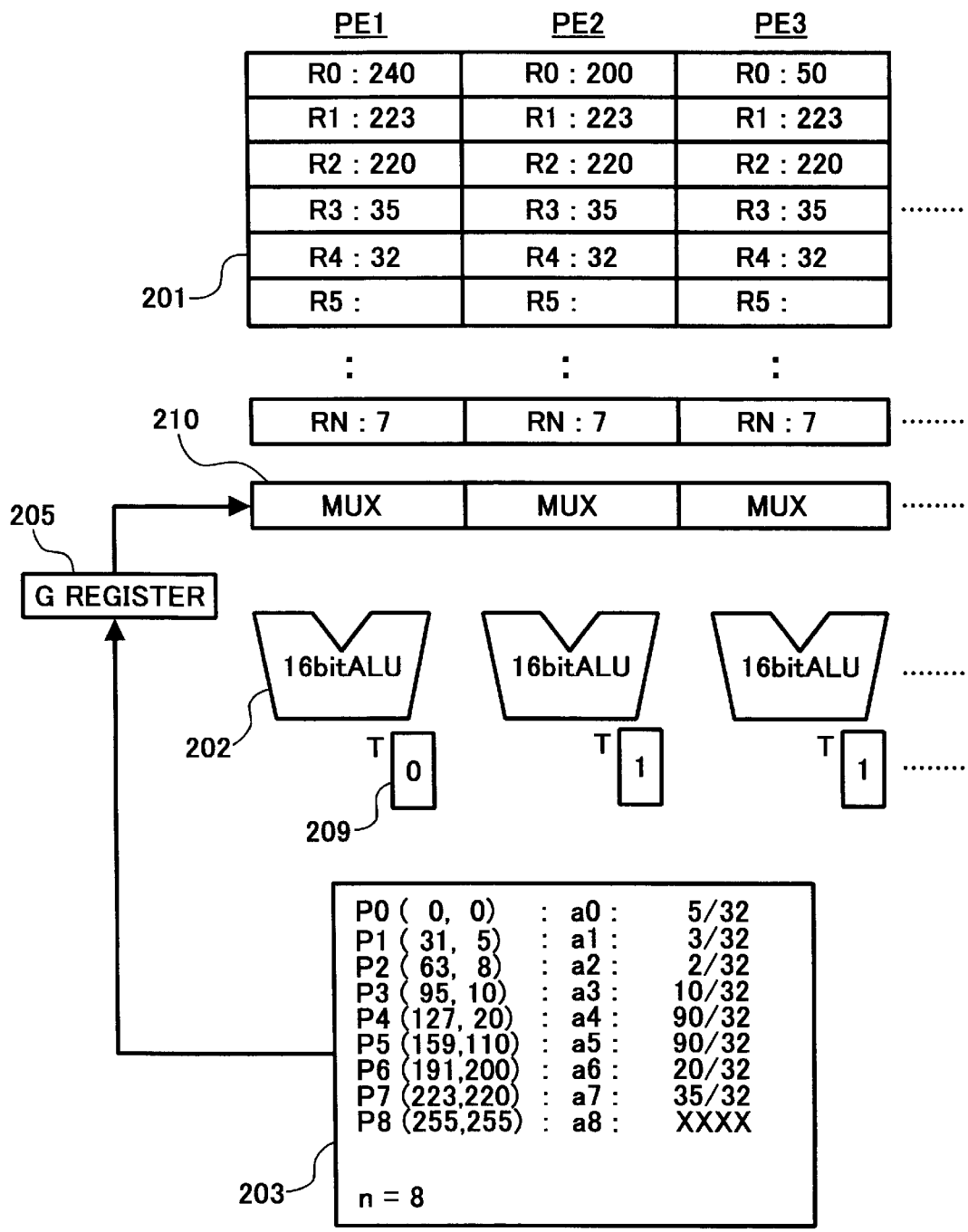
FIG. 9 is an illustration showing register conditions when a number stored in segment registers is 7 in the case of a total of 8 segments.
Figure 10:
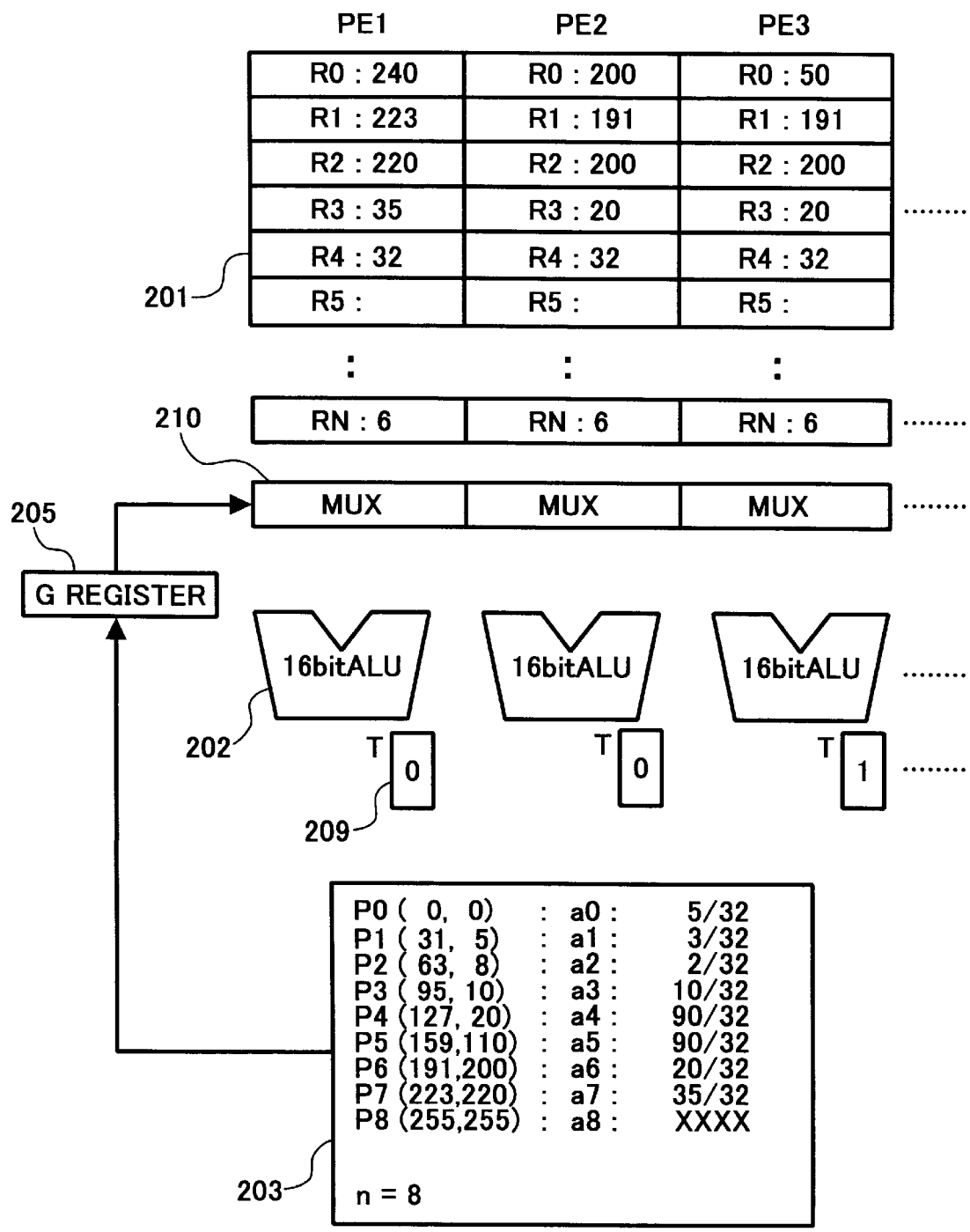
FIG. 10 is an illustration showing register conditions when the number stored in the segment registers is 6.

At the initial condition of the input data updating operation, the registers of the DSP processor are set to the respective input values, as shown in FIG. 8. The number n stored in each of the segment registers RN is set to 8. The x-coordinate data $x_7(=223)$ and the y-coordinate data $y_7(=220)$ are loaded in the R1 and R2 registers, respectively, with respect to all the processor elements PE1 through PE3, from the external data RAM 203. Also, the slope data $a_7(=35/32)$ are loaded in the R3 and R4 registers as a numerator and a denominator, respectively, with respect to all the processor elements PE1 through PE3, from the external data RAM 203.

Figure 7:
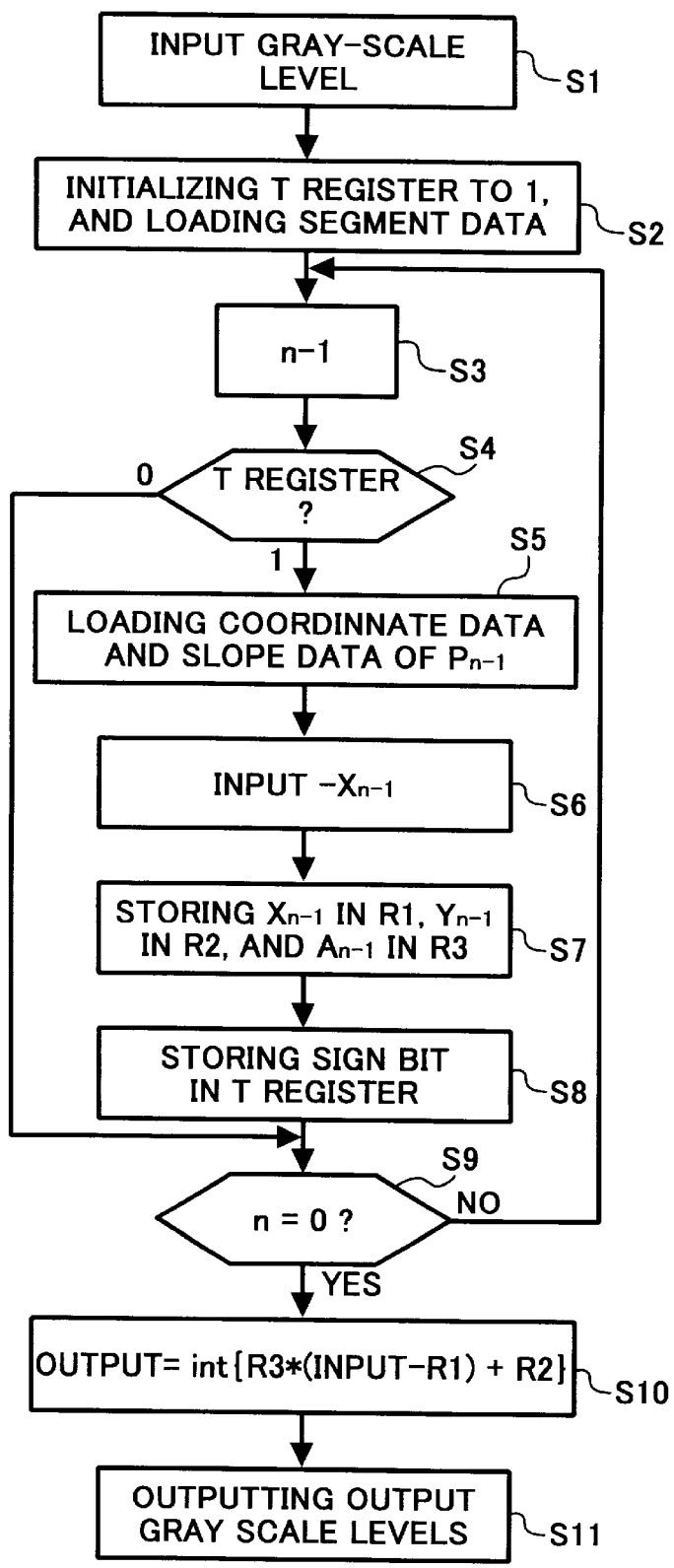
FIG. 7 is a flowchart explaining an operation for calculating a gamma conversion performed by the DSP of FIG. 4.

Then, the number n(=7) is loaded in the RN registers from the external data RAM 203 to start the first subtraction of Step S6 of FIG. 7. A result of the subtraction operation (R0-x7=240-223>0) is positive in the processor element PE1. The T register 209 of the processor element PE1 is thus set to 0 (see FIG. 9), so that the contents of the R1 through R4 registers of the processor element PE1 are retained thereafter. On the other hands, the T registers 209 of the other processor elements PE2 and PE3 keep the value of 1 at this point of time.

Then, the number n stored in the segment register is reduced to 6 by loading the number n (=6) from the external data RAM 203. Subsequently, the x-coordinate data $x_7$(=191) and the y-coordinate data $y_7$(=200) are loaded in the R1 and R2 registers, respectively, with respect to the processing elements PE2 and PE3, from the external data RAM 203. Further, the slope data $a_7$(=20/32) are loaded in the R3 and R4 registers as a numerator and a denominator, respectively, with respect to the processing elements PE2 and PE3. A result of the subtraction operation (R0−x6=200−191>0) is positive in the processor element PE2. The T register 209 of the processor element PE2 is thus set to 0 (see FIG. 10), so that the contents of the R1 through R4 registers of the processor element PE2 are retained thereafter. The T register 209 of the processor element PE3 still keeps the value of 1 at this stage.

The subtraction operation is proceeded in this way by decreasing the number n. When the number n is 1, the R1 through R4 registers are set to 31, 5, 3, and 32, respectively, in the processing element PE3, and the result of the subtraction operation (R0−$x_1$=50−31>0) is positive. Therefore, it is not until the number n becomes 1 that the processor element PE3 updates the contents of the R1 through R4 registers thereof.

Figure 11:
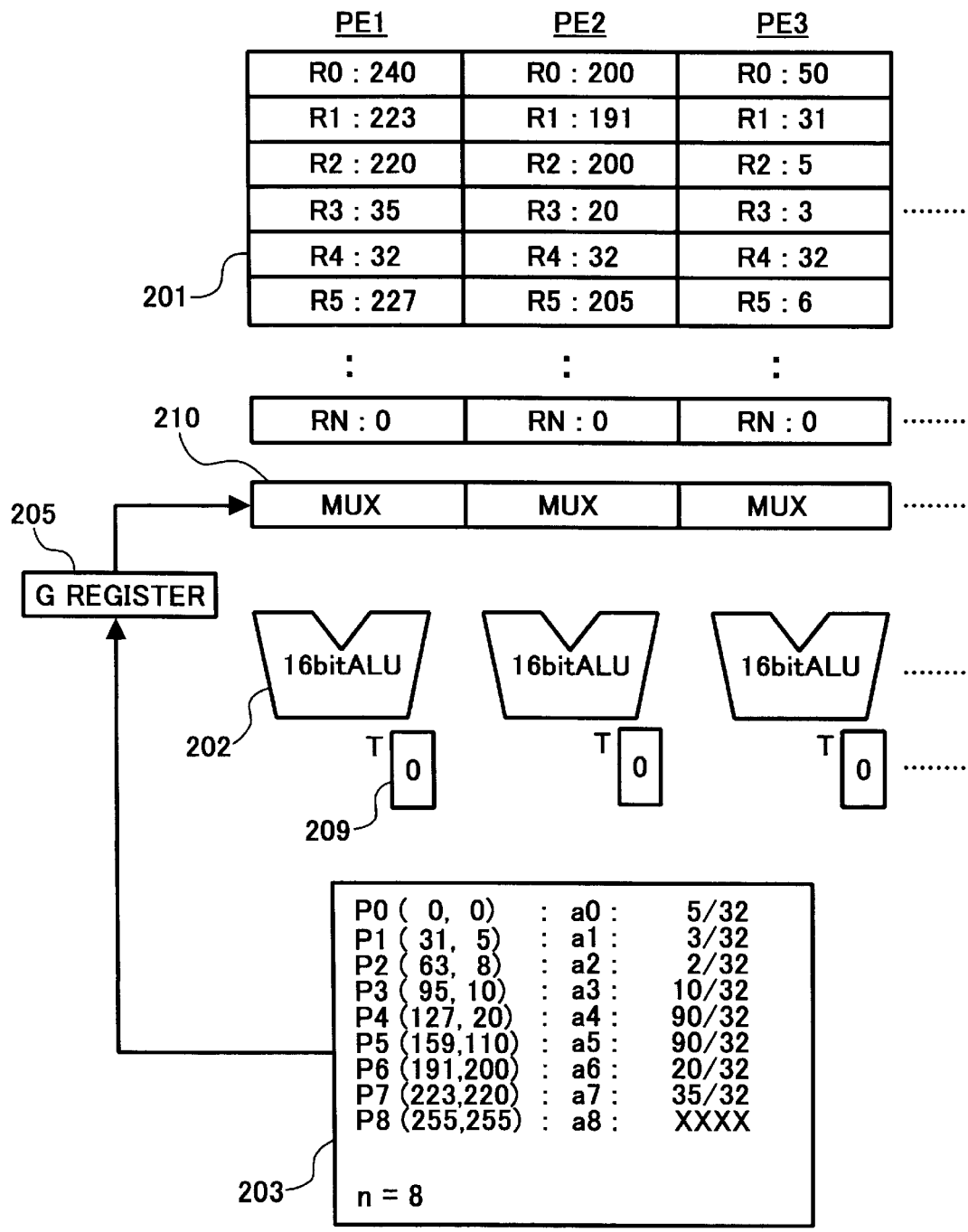
FIG. 11 is an illustration showing register conditions when the number stored in the segment registers is 0.

When the number n becomes 0 (see FIG. 11), the ALUs 202 of all the processing elements PE1 through PE3 calculate int{R3/R4×(R0−R1)−R2} to obtain output gray-scale levels. The obtained output gray-scale levels are stored in the R5 registers. Register conditions at this point of time are shown in FIG. 11.

In this manner, pertinent segments are determined for all the pixels by the subtractive operations of the ALUs 202 and appropriate parameters selected accordingly are used for calculating the output gray-scale levels simultaneously for all the pixels.

Figure 12:
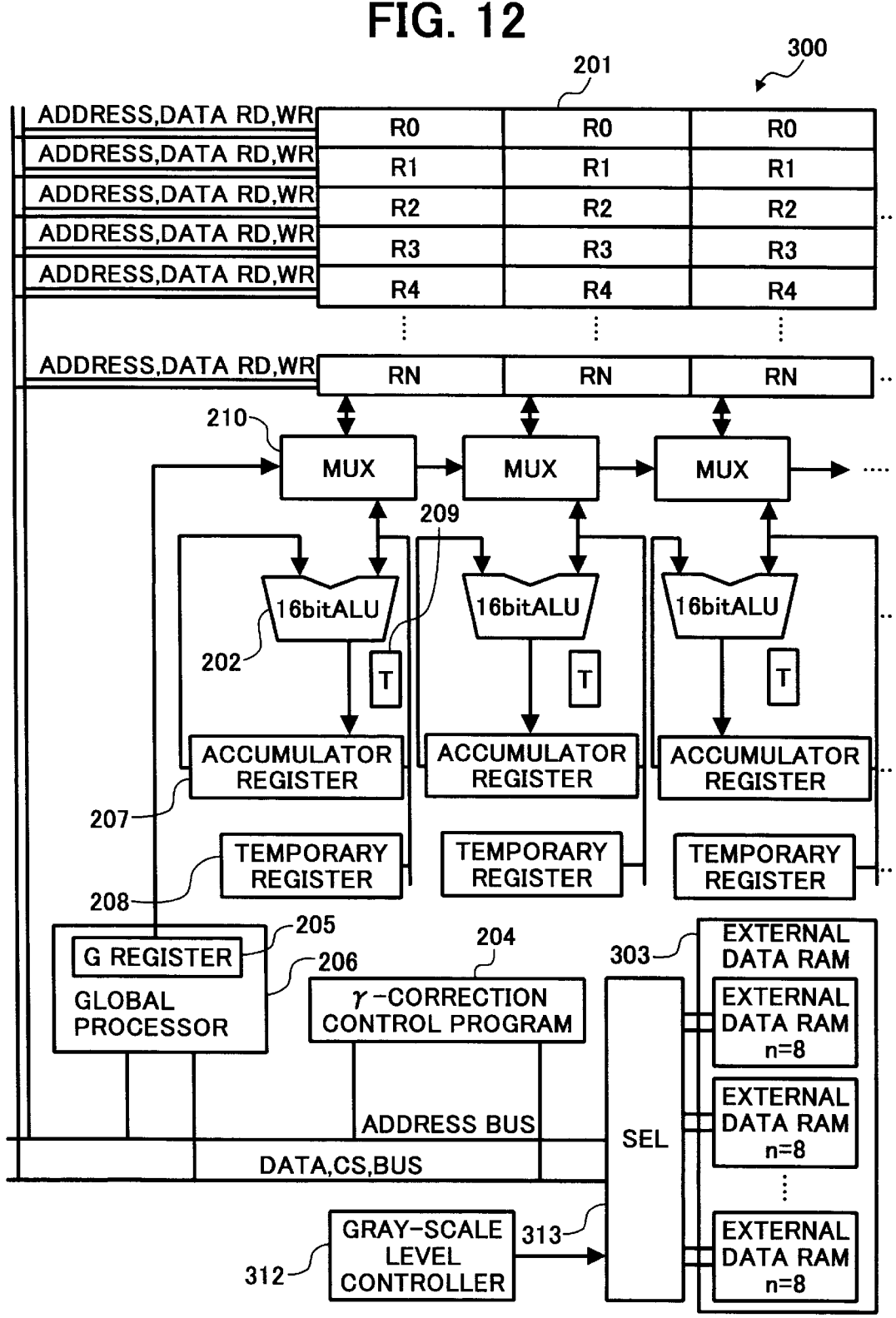
FIG. 12 is a schematic block diagram of another exemplary digital signal processor (DSP) which includes an external memory storing a plurality of parameter sets.

Next, a modified embodiment of the gamma correction device 200 shown in FIG. 4 will be explained with reference to FIG. 12. This modified embodiment of the gamma correction device is referred to as a gamma correction device 300, as shown in FIG. 12. The gamma correction device 300 of FIG. 12 is similar to the gamma correction device 200 of FIG. 4, except for a external data RAM 303, a gray-scale level controller 312, and a gray-scale level selector 313. The external data RAM 303 of the gamma correction device 300 includes a plurality of different gray-scale level data sets each of which has a data structure similar to that contained in the external data RAM 203. Of course, each data set includes the information of the number n, the x- and y-coordinate data and the slope data, as shown in FIG. 4, and the gray-scale level represented by each data set is different from others. The gray-scale level controller 312 determines a required gray-scale level (rank), and sends the information of the required gray-scale level (rank) to the gray-scale level selector 313. The gray-scale level selector 313 selects one gray-scale level data set from among the plurality of the data sets, according to the information of the required gray-scale level data set (rank). The gray-scale level selector 313 interfaces the signals between the external data RAM 303 and other components of the gamma correction device 300.

With the above-described configuration, the gamma correction device 300 is capable of correcting an input gamma curve to a plurality of different gray-scale levels. That is, the gamma correction device 300 can perform the gamma correction operation in more flexible and accurate manners in accordance with the characteristics of input image. For example, the gamma correction device 300 can increase or decrease an output gray-scale level against an input image. Also, the gamma correction device 300 can adjust the contrast of an image in a gray-scale level range by changing the slope data.

Figure 13:
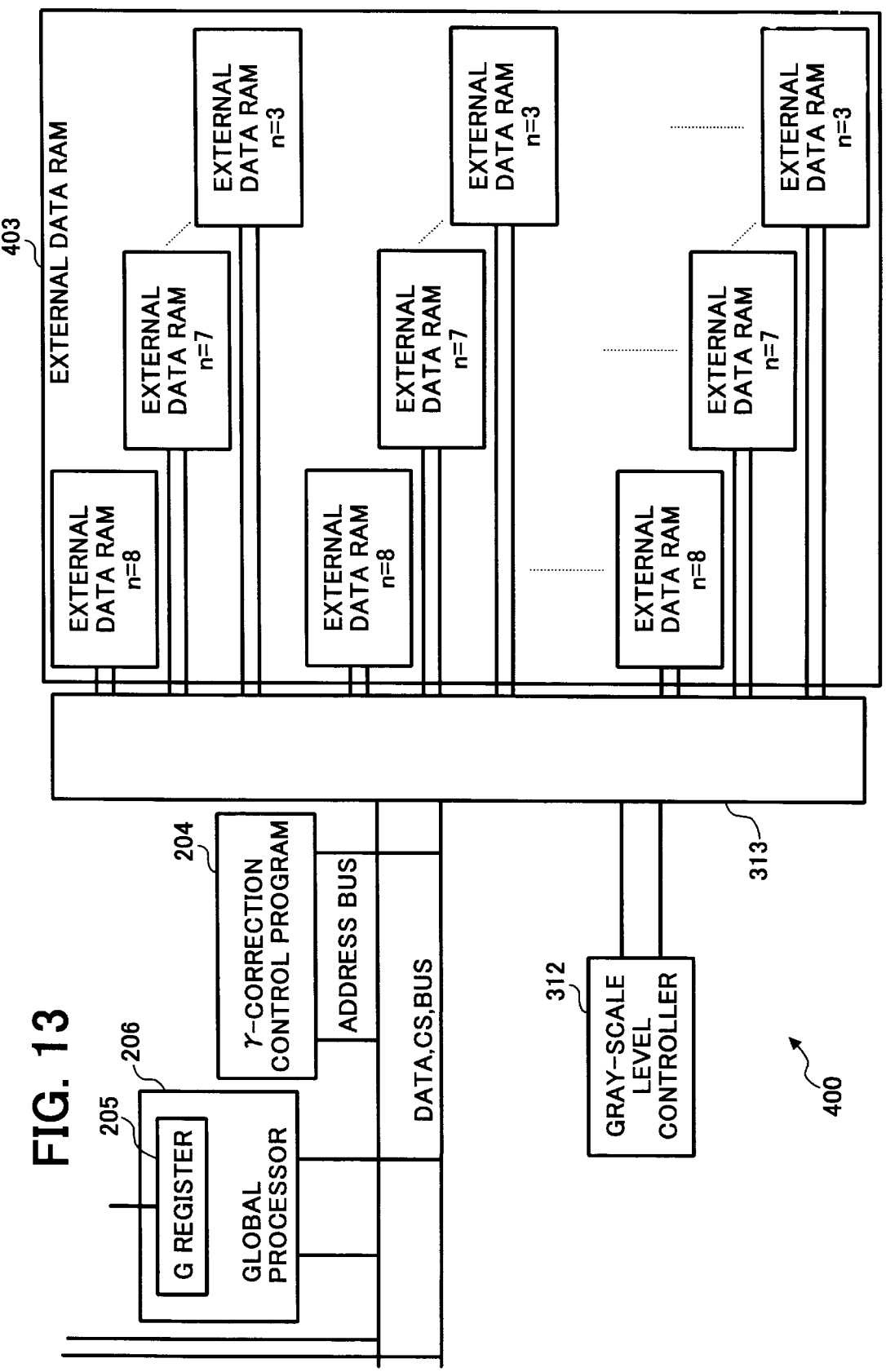
FIG. 13 is a schematic block diagram of another exemplary digital signal processor (DSP) which includes an external memory storing a plurality of parameter set groups, each of which includes a plurality of parameter sets.

Referring to FIG. 13, a modified embodiment of the gamma correction device 300 of FIG. 12 is explained. This modified embodiment of the gamma correction device is referred to as a gamma correction device 400. A modified portion of the gamma correction device 400 is shown in FIG. 13. The gamma correction device 400 is similar to the gamma correction device 300 of FIG. 12, except for a external data RAM 403 shown in FIG. 13. The external data RAM 403 of the gamma correction device 400 includes a plurality of gray-scale level correction data groups. Each of the gray-scale level correction data groups includes a plurality of gray-scale level data sets. In this case, the values included in the plurality of gray-scale level data sets are based on the same gamma correction curve. However, each of the gray-scale level data sets has a different number n, which is the number for dividing the gray-scale level range so as to obtain a plurality of line segments. That is, while the gamma correction device 300 is a single division number that divides the gray-scale level range into 8, the gamma correction device 400 has a plurality of division numbers such as 8, 7, 6, 5, 4, and 3. For example, the gray-scale level set having the number 3 divides the gray-scale level range into 3, thereby obtaining 3 line segments. Of course, each data set includes the information of that number n, the x- and y-coordinate data and the slope data, as shown in FIG. 13, and the gray-scale level represented by each gray-scale level correction data group is different from others.

With the above-described configuration, the gamma correction device 400 is capable of correcting an input gamma curve to a plurality of different levels with a plurality of different line segmentations. That is, the gamma correction device 400 can perform the gamma correction operation in more flexible and accurate manners in accordance with the characteristics of input image. For example, the gamma correction device 400 can increase or decrease an output gray-scale level against an input image according to the type of the input image. If the input image has a lower gray-scale value such as a black and white letter print, the gamma correction device 400 can perform the gamma correction operation with a smaller segment number such as 3, for example. In addition, since the gamma correction operation with the smaller segment number decreases the operation steps, the gamma correction device 300 can decrease the operation steps of the gamma correction.

Figure 14:
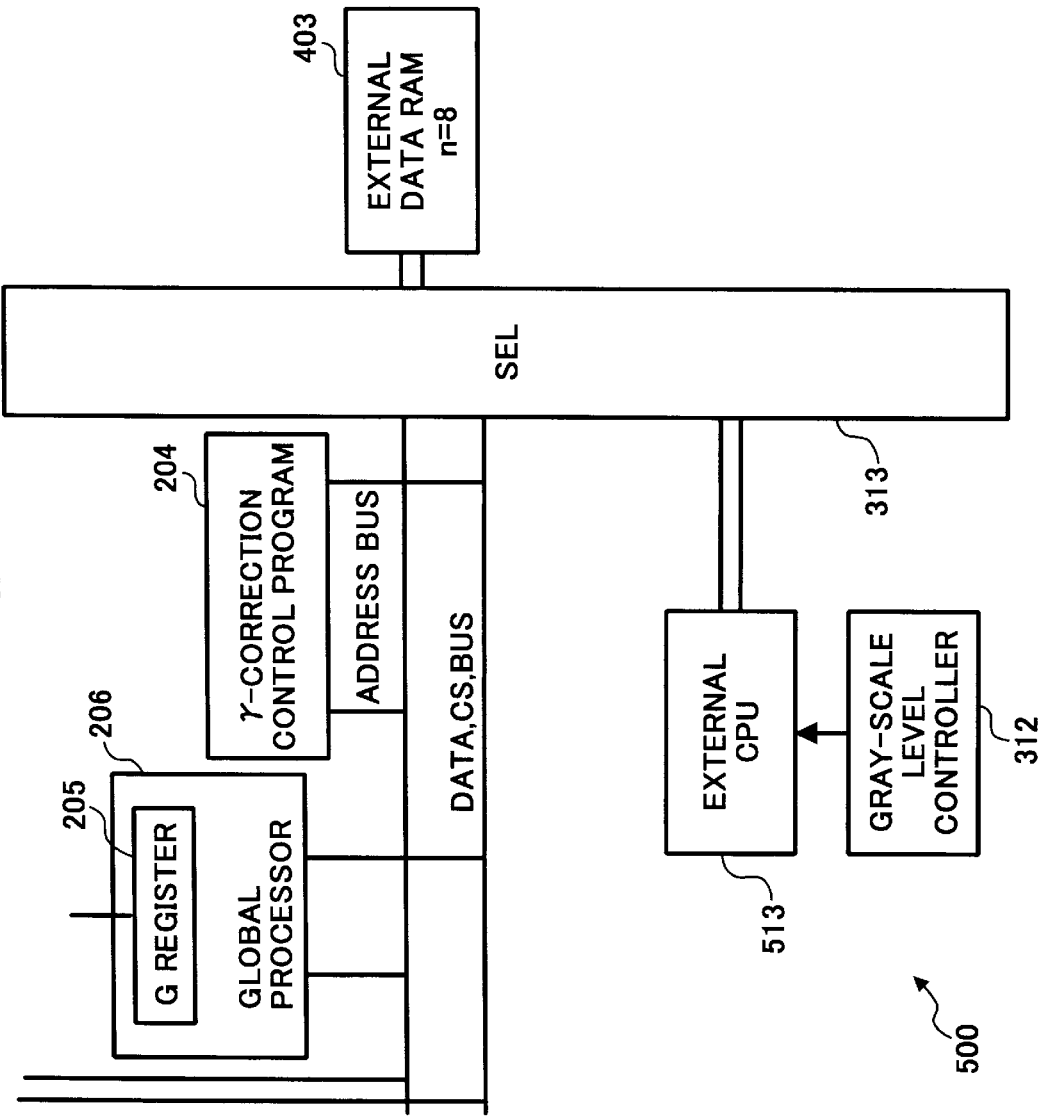
FIG. 14 is a schematic block diagram of another exemplary digital signal processor (DSP) which is connected to an external computer.

Next, a modified embodiment of the gamma correction device 400 of FIG. 13 will be explained with reference to FIG. 15. This modified embodiment of the gamma correction device is referred to as a gamma correction device 500. A modified portion of the gamma correction device 500 is shown in FIG. 14. The gamma correction device 500 is similar to the gamma correction device 400 of FIG. 13, except for a connection to an external CPU (Central Processing Unit) 513, as shown in FIG. 14. The external CPU 513 controls the entire operation of the digital copying apparatus 1, including the image processing unit 11 (FIG. 1).

In the configuration of the gamma correction device 500, the external CPU 513 is connected to the gray-scale level controller 312 and to the gray-scale level selector 313 so as to write data in the external data RAM 403 to change the x- and y-coordinate data $x_n$ and $y_n$, the slope data $a_n$, and segment number n, based on the information from the gray-scale level controller 312. More specifically, the external CPU 513 determines if the gamma correction data entry operation is necessary relative to the external data RAM 403, based on the information from the gray-scale controller 312. If the external CPU 513 determines the execution of the gamma correction data entry operation, it enables a mode change signal (see FIG. 14) to change a communications mode of the gray-scale level selector 313 before the global processor 206 starts to load the data to the RN registers from the external data RAM 403 via die gray-scale level selector 313. Thereby, the external CPU 513 can write desired data of the x- and y-coordinate data $x_n$ and $y_n$, the slope data $a_n$ and segment number n in the external data RAM 403. Upon completing the writing operation, the external CPU 513 disables the mode change signal to return the communications mode of the gray-scale level selector 313 so that the gray-scale level selector 313 is connected to the global processor 206. Accordingly, the newly written data in the external data RAM 403 are loaded to the RN registers via the global processor 206.

The external CPU 513, which controls the entire operation of the system, may start the image reading operation after completing the above-described gamma correction data entry operation and control the timing of the gamma conversion operation.

Figure 15:
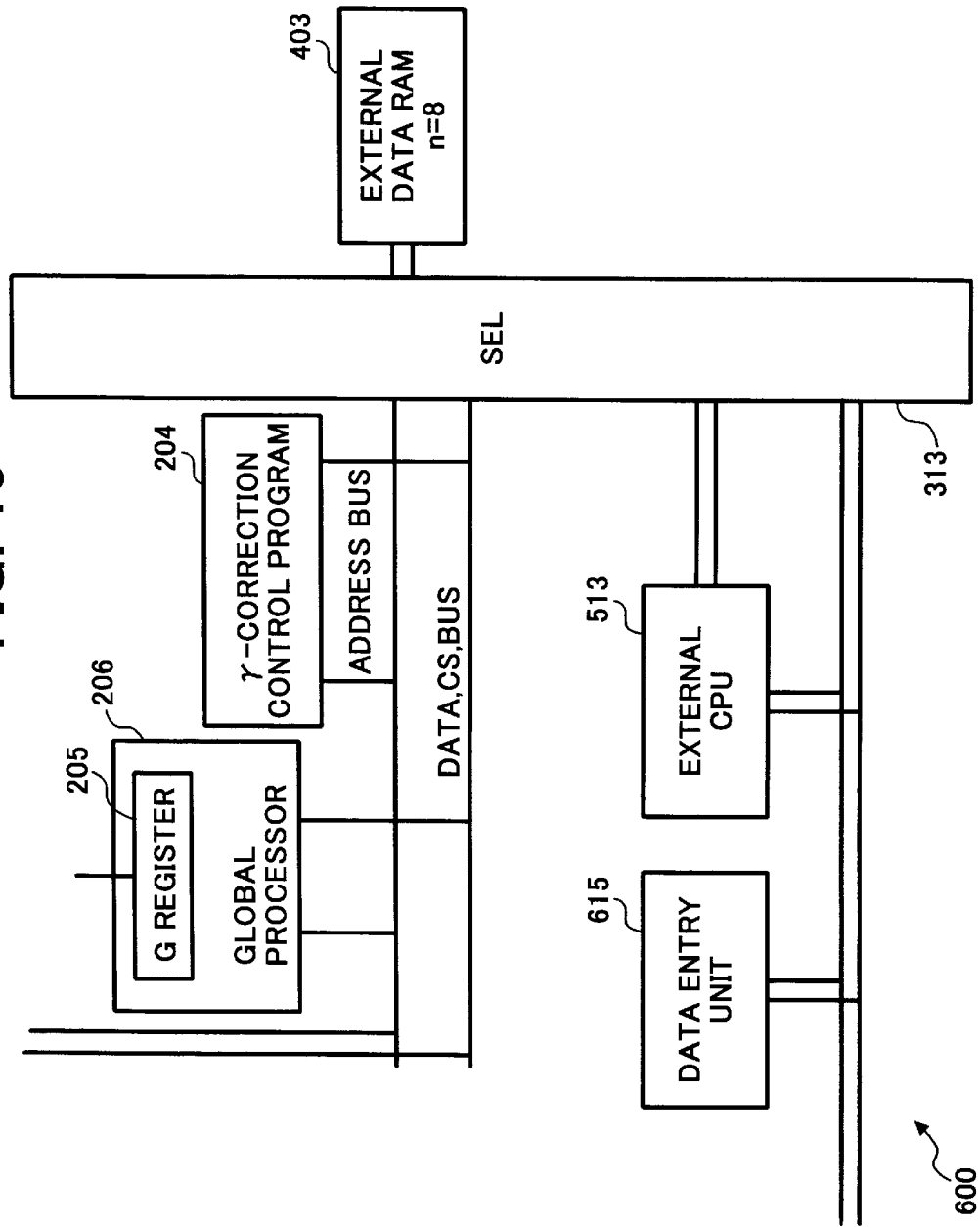
FIG. 15 is a schematic block diagram of another exemplary digital signal processor (DSP) which includes an operation panel unit.

Referring to FIG. 15, a modified embodiment of the gamma correction device 500 of FIG. 14 is explained. This modified embodiment of the gamma correction device is referred to as a gamma correction device 600. A modified portion of the gamma correction device 600 is shown in FIG. 15. The gamma correction device 600 is similar to the gamma correction device 500 of FIG. 14, except for a connection to a data entry unit 615, as shown in FIG. 15. The data entry unit 615 is connected to the external CPU 513 and the gray-scale level selector 313. The data entry unit 615 enters data to the external data RAM 403 via the external CPU 513, which activates the mode change signal and the gray-scale level selector 313. Thereby, users can use the data entry unit 615 to write arbitrary gamma correction data, including the x- and y-coordinate data $x_n$ and $y_n$, the slope data $a_n$, and segment number n, in the external data RAM 403.

Such a data entry unit 615 may be combined with the operation unit 14 of the digital copying apparatus 1 (see FIG. 1).

Figure 16:
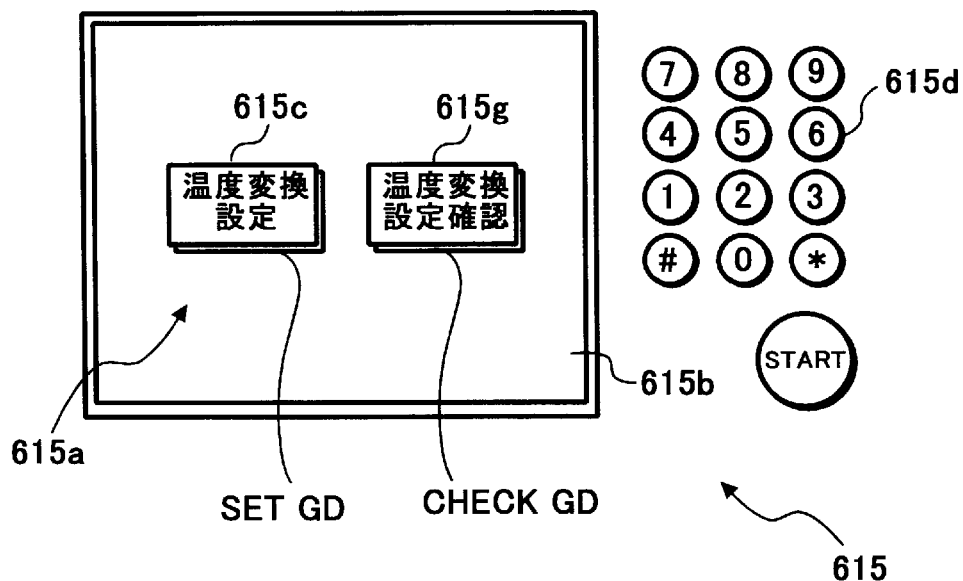
FIGS. 16–19 are schematic illustrations of the operation panel unit and exemplary screens on a display of the operation panel unit.
Figure 17:
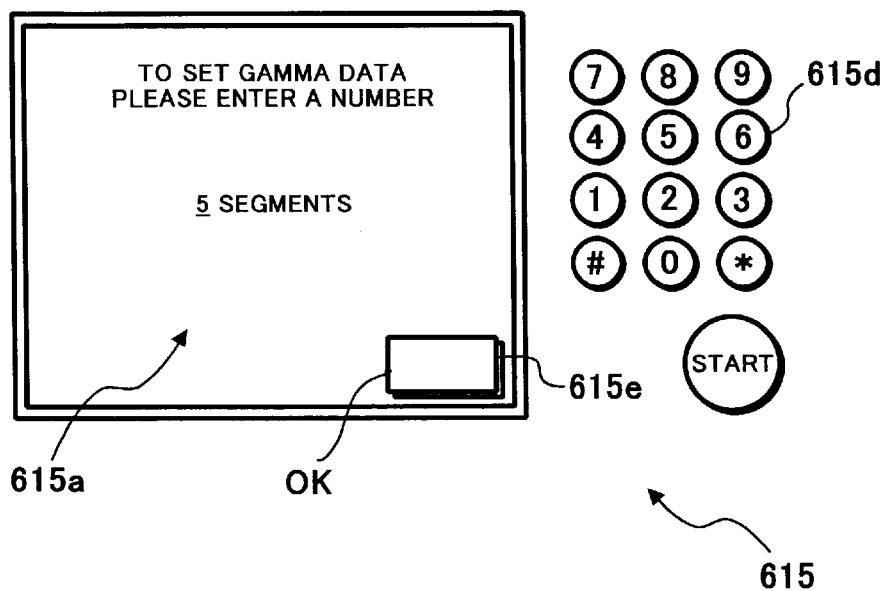

An example of the data entry unit 615 is illustrated in FIGS. 16–17. As illustrated, the data entry unit 615 includes an LCD (liquid crystal display) display 615a which is covered with a touch-sensitive-panel 615b and a key-pad 615d. The LCD display 615a of FIG. 16 shows an initial screen thereon. In the initial screen of FIG. 16, the LCD display 615a shows a "Set GD" display mark 615c (GD stands for gamma data) and a "Check GD" display mark 615g (explained later). When the "Set GD" display mark 615a is touched by the operator, the LCD display 615a shows the next screen as illustrated in FIG. 17.

In the screen of FIG. 17, the LCD display 615a indicates a message indicating that a desired value specifying the number of segments dividing the gray-scale levels can be entered through the key-pad 615d. After a completion of entering the value, an "OK" display mark 615e is needed to be touched by the operator. Once the "OK" display mark 615e is touched, the operation for specifying the desired segment number is completed, and the LCD display 615a then shows the next screen as illustrated in FIG. 18.

Figure 18:
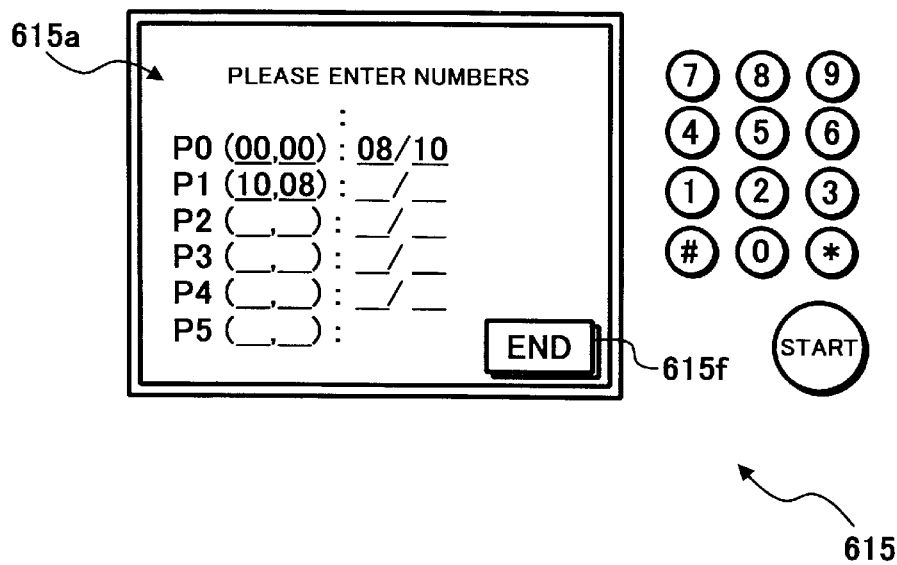

In the screen of FIG. 18, the LCD display 615a shows the next screen for entering desired values for the x- and y-coordinate data $x_n$ and $y_n$ and the slope data $a_n$. Desired values are expected to be entered sequentially from the P0, which means the segment number 1, up to the P5, which means the segment number 6, for example, in the screen using the key-pad 615d. After a completion of entering the values, an "END" display mark 615f needs to be touched by the operator. Upon touching the "END" display mark 615f, the operation for specifying the desired coordinate and slope data is completed. At the same time, the data entry unit 615 transfers the values entered through the above operation, together with an instruction for executing the gamma correction data entry, to the external CPU 513. Thereby, the operation of the gamma correction data entry is completed.

When the external CPU 513 receives the desired gamma correction data together with the instruction for executing the gamma correction data entry, the external CPU 513 determines the execution of the gamma correction data entry operation. Then, the external CPU 513 enables the mode change signal (see FIG. 14) to change the communications mode of the gray-scale level selector 313 before the global processor 206 starts to load the data to the RN registers from the external data RAM 403 via the gray-scale level selector 313. Then, the external CPU 513 can write the data of the x- and y-coordinate data $x_n$ and $y_n$, the slope data $a_n$, and segment number n, which have been transferred from the data entry unit 615, in the external data RAM 403. Upon completing the writing operation, the external CPU 513 disables the mode change signal to return the communications mode to the gray-scale level selector 313 so that the gray-scale level selector 313 is connected to the global processor 206. Accordingly, the newly written data in the external data RAM 403 are loaded to the RN registers via the global processor 206.

The external CPU 513, which controls the entire operations of the system, may start the image reading operation after completing the above-described gamma correction data entry operation and controls the timing of the gamma conversion operation.

Figure 19:
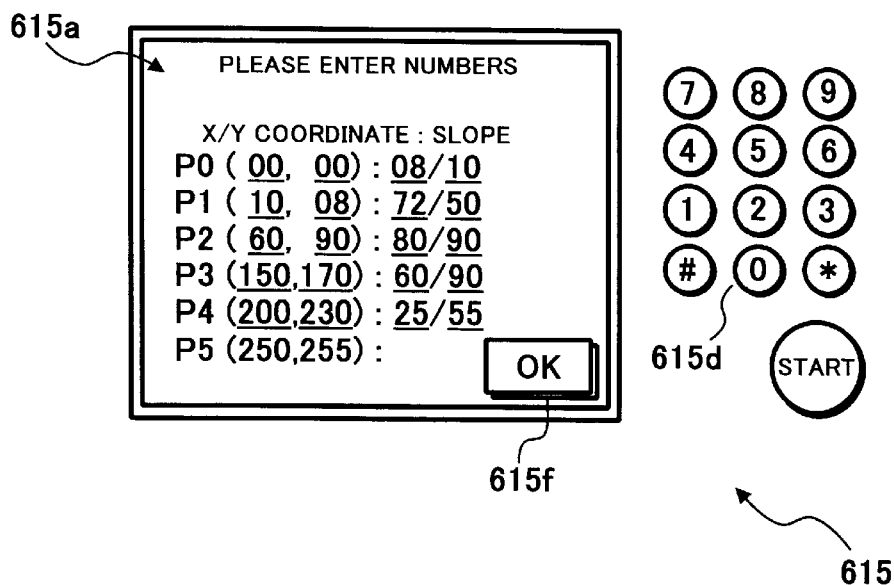

The data entry unit 615 can also be used to confirm the values of the present gamma correction data. As illustrated in FIG. 16, the LCD display 615a shows the "Check GD" display mark 615g. When the "Check GD" display mark 615g is touched by the operator, the LCD display 615a shows a screen that indicates the present values of the gamma correction data, as shown in FIG. 19. More specifically, when the "Check GD" display mark 615g is touched, the data entry unit 615 requests the external CPU 513 to read the gamma correction data, including the x- and y-coordinate data $x_n$ and $y_n$, the slope data $a_n$, and segment number n, from the external data RAM 403. Upon receiving such a request, the external CPU 513 enables the mode change signal (see FIG. 14) to change the communications mode of the gray-scale level selector 313 so as to read the present gamma correction data from the external data RAM 403. Then, the external CPU 513 reads the data of the x- and y-coordinate data $x_n$ and $y_n$, the slope data $a_n$, and segment number n stored in a specific region of the external data RAM 403. Upon completing the reading operation, the external CPU 513 transfers the read data to the data entry unit 615 and then shows the data on the LCD display 615a. The external CPU 513 disables the mode change signal to return the communications mode to the gray-scale level selector 313.

When the check of the present values of the gamma correction data is completed, the operator needs to touch an OK mark 615f, as shown in FIG. 19. Then, the operation is ended.

In this way, the present values of the gamma correction data can be checked on the LCD display 615a.

The above embodiments are described with reference to an example in which gamma correction is carried out by a DSP processor. As previously noted, the present invention is not limited to the calculation of gamma correction but can be applied to any gray-scale-conversion scheme. For example, the invention is applicable to a quantization process in which input gray-scale levels in a continuous scale are quantized or in which input gray-scale levels in a discrete scale are converted into a fewer number of output gray-scale levels. Further, the present invention is applicable to a gray-scale conversion based on a Yule-Nielsen formula, for example.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by letters patent of the United States is:

1. An image processing apparatus comprising:
    a memory configured to store at least one gamma conversion algorithm and a plurality of parameter sets corresponding to predefined gray-scale ranges;
    a plurality of parameter registers; and
    a gamma conversion processor configured to select a suitable parameter set from among said plurality of parameter sets stored in said memory according to a required output gray-scale range, to transfer said selected suitable parameter set from said memory to said parameter registers sequentially during a gamma conversion operation, to perform at a time in parallel said gamma conversion operation with respect to input gray-scale values of successive pixels of an input image data stream using said at least one gamma conversion algorithm stored in said memory and said selected suitable parameter set sequentially stored in said parameter registers, and to generate a serial output gray-scale signal based on a result of said gamma conversion operation.

2. An image processing apparatus as defined in claim 1, further comprising a gray-scale range controller configured to determine said required output gray-scale range.

3. An image processing apparatus comprising:
    a re-programmable memory configured to store a gamma conversion algorithm and a plurality of parameter set groups corresponding to a plurality of predefined gray-scale ranges, each of said parameter set groups including a plurality of parameter sets corresponding to a plurality of predefined gray-scale segment numbers;
    a gray-scale range controller configured to determine a required output gray-scale range;
    a plurality of parameter registers;
    a plurality of calculators corresponding to a plurality of successive pixels in a raster of an input image data stream, each of said calculators configured to perform a gamma conversion operation with respect to one pixel;
    a gamma conversion processor configured to determine a gray-scale segment number according to an input gray-scale range, to divide said input gray-scale range accordingly into said determined gray-scale segment number, to select a suitable parameter set from among said plurality of parameter sets stored in said re-programmable memory according to said required output gray-scale range determined by said gray-scale range controller and said determined gray-scale segment number, to transfer sequentially said selected suitable parameter set from said re-programmable memory to said parameter registers during a gamma conversion operation, to cause said plurality of calculators to perform at a time in parallel said gamma conversion operation with respect to said input gray-scale ranges of successive pixels of an input image data stream using said gamma conversion algorithm and said selected suitable parameter set stored in said parameter registers, and to generate a serial output gray-scale signal based on a result of said gamma conversion operation.

4. An image processing apparatus as defined in claim 3, wherein each of said plurality of parameter sets includes a predefined gray-scale segment number and combinations of values of x- and y-coordinates and a value of a slope for respective gray-scale segments in a corresponding gray-scale range.

5. An image processing apparatus as defined in claim 3, wherein said re-programmable memory is configured to store a plurality of different gray-scale segment numbers corresponding to a plurality of different gray-scale ranges, and said gamma conversion processor is configured to determine said gray-scale segment number by selecting one of said plurality of different gray-scale segment numbers according to said required output gray-scale range determined by said gray-scale range controller.

6. An image processing apparatus as defined in claim 3, wherein said re-programmable memory is connected to an external computer and is configured to store a gamma conversion algorithm, one parameter set corresponding to one predefined gray-scale range, and a predefined gray-scale segment number, said one parameter set including a plurality of parameters corresponding to a predefined gray-scale segment number, said apparatus further comprising:
    a selector configured to select one of a connection of said re-programmable memory within said apparatus and a connection between said re-programmable memory and said external computer, and
    wherein said external computer is configured to cause said selector to select said connection between said re-programmable memory and said external computer, and changes contents of said one parameter set and said predefined gray-scale segment number in response to a required output gray-scale range determined by said gray-scale range controller.

7. An image processing apparatus as defined in claim 6, further comprising a display and data entry unit which is connected to said external computer and said re-programmable memory, wherein the parameter of said one parameter set and said predefined gray-scale segment number can be changed through said display and data entry unit.

8. An image processing apparatus as defined in claim 7, wherein said display and data entry unit is configured to read said contents of said one parameter set and said predefined gray-scale segment number from said re-programmable memory and indicates said read contents thereon.

9. An image processing apparatus comprising:
memory means for storing at least one gamma conversion algorithm and a plurality of parameter sets corresponding to predefined gray-scale ranges;
a plurality of parameter register means; and
gamma conversion processor means for selecting a suitable parameter set from among said plurality of parameter sets stored in said memory means according to a required output gray-scale range, for transferring said selected suitable parameter set from said memory means to said parameter registers sequentially during a gamma conversion operation, for performing at a time in parallel said gamma conversion operation with respect to input gray-scale values of successive pixels of an input image data stream using said at least one gamma conversion algorithm stored in said memory means and said selected suitable parameter set sequentially stored in said parameter register means, and for generating a serial output gray-scale signal based on a result of said gamma conversion operation.

10. An image processing apparatus as defined in claim 9, further comprising gray-scale range controlling means for determining said required output gray-scale range.

11. An image processing apparatus comprising:
re-programmable memory means for previously storing a gamma conversion algorithm and a plurality of parameter set groups corresponding to a plurality of predefined gray-scale ranges, each of said parameter set groups including a plurality of parameter sets corresponding to a plurality of predefined gray-scale segment numbers;
gray-scale range controlling means for determining a required output gray-scale range;
a plurality of parameter register means;
a plurality of calculator means corresponding to a plurality of successive pixels in a raster of an input image data stream, each of said calculator means performing a gamma conversion operation with respect to one pixel;
gamma conversion processor means for determining a gray-scale segment number according to an input gray-scale range, for dividing said input gray-scale range accordingly into said determined gray-scale segment number, for selecting a suitable parameter set from among said plurality of parameter sets stored in said re-programmable memory means according to said required output gray-scale range determined by said gray-scale range controlling means and said determined gray-scale segment number, for transferring sequentially said selected suitable parameter set from said re-programmable memory means to said parameter register means during a gamma conversion operation, for causing said plurality of calculator means to perform at a time in parallel said gamma conversion operation with respect to said input gray-scale ranges of successive pixels of an input image data stream using said gamma conversion algorithm and said selected suitable parameter set stored in said parameter register means, and for generating a serial output gray-scale signal based on a result of said gamma conversion operation.

12. An image processing apparatus as defined in claim 11, wherein each of said plurality of parameter sets includes a predefined gray-scale segment number and combinations of values of x- and y-coordinates and a value of a slope for respective gray-scale segments in a corresponding gray-scale range.

13. An image processing apparatus as defined in claim 11, wherein said re-programmable memory means stores a plurality of different gray-scale segment numbers corresponding to a plurality of different gray-scale ranges, and said gamma conversion processor means determines said gray-scale segment number by selecting one of said plurality of different gray-scale segment numbers according to said required output gray-scale range determined by said gray-scale range controlling means.

14. An image processing apparatus as defined in claim 11, wherein said re-programmable memory means is connected to external computer means and has stored therein a gamma conversion algorithm and one parameter set corresponding to one predefined gray-scale range, and a predefined gray-scale segment number, said one parameter set including a plurality of parameters corresponding to a predefined gray-scale segment number, said apparatus further comprising:
selector means for selecting one of a connection of said re-programmable memory means within said apparatus and a connection between said re-programmable memory means and said external computer means, and
wherein said external computer means causes said selector means to select said connection between said re-programmable memory means and said external computer means and changes contents of said one parameter set and said predefined gray-scale segment number in response to a required output gray-scale range determined by said gray-scale range controlling means.

15. An image processing apparatus as defined in claim 14, further comprising display and data-entry means, which is connected to said external computer means and said re-programmable memory means, for changing said contents of said one parameter set and said predefined gray-scale segment number.

16. An image processing apparatus as defined in claim 15, wherein said display and data-entry means reads said contents of said one parameter set and said predefined gray-scale segment number from said re-programmable memory means and indicates said read contents thereon.

17. A method of image processing, comprising the steps of:
storing at least one gamma conversion algorithm and a plurality of parameter sets corresponding to predefined gray-scale ranges into a memory;
selecting a suitable parameter set from among said plurality of parameter sets stored in said memory according to a required output gray-scale range;
transferring said selected suitable parameter set from said memory to a plurality of parameter registers sequentially during a gamma conversion operation;
performing at a time in parallel said gamma conversion operation with respect to input gray-scale values of successive pixels of an input image data stream using at least one said gamma conversion algorithm stored in said memory and said selected suitable parameter set sequentially stored in said parameter registers; and
generating a serial output gray-scale signal based on a result of said gamma conversion operation.

18. A method as defined in claim 17, further comprising the step of:
determining said required output gray-scale range.

19. A method of image processing, comprising the steps of:

- storing a gamma conversion algorithm and a plurality of parameter set groups corresponding to a plurality of predefined gray-scale ranges, each of said parameter set groups including a plurality of parameter sets corresponding to a plurality of predefined gray-scale segment numbers into a re-programmable memory;
- establishing a required output gray-scale range;
- providing a plurality of calculator corresponding to a plurality of successive pixels in a raster of an input image data stream, each of said calculator capable of performing a gamma conversion operation with respect to one pixel;
- determining a gray-scale segment number according to an input gray-scale range;
- dividing said input gray-scale range accordingly into said determined gray-scale segment number;
- selecting a suitable parameter set from among said plurality of parameter sets stored in said re-programmable memory according to said required output gray-scale range established in said established step and said determined gray-scale segment number;
- transferring sequentially said selected suitable parameter set from said re-programmable memory to a plurality of parameter registers during a gamma conversion operation;
- causing said plurality of calculators to perform at a time in parallel said gamma conversion operation with respect to said input gray-scale ranges of successive pixels of an input image data stream using said gamma conversion algorithm and said selected suitable parameter set stored in said parameter registers; and
- generating a serial output gray-scale signal based on a result of said gamma conversion operation.

20. A method as defined in claim 19, wherein said providing step provides each of said plurality of parameter sets including a predefined gray-scale segment number and combinations of values of x- and y-coordinates and a value of a slope for respective gray-scale segments in a corresponding gray-scale range.

21. A method as defined in claim 19, wherein said storing step stores into said re-programmable memory a plurality of different gray-scale segment numbers corresponding to a plurality of different gray-scale ranges and said determining step determines said gray-scale segment number by selecting one of said plurality of different gray-scale segment numbers according to said required output gray-scale range established in said establishing step.

22. A method as defined in claim 19, wherein said storing step stores a gamma conversion algorithm, one parameter set corresponding to one predefined gray-scale range, and a predefined gray-scale segment number into said re-programmable memory, said one parameter set including a plurality of parameters corresponding to a predefined gray-scale segment number, said method further comprising the steps of:

- connecting said re-programmable memory to an external computer;
- selecting a connection between said re-programmable memory and said external computer;
- changing contents of said one parameter set and said predefined gray-scale segment number in response to a required output gray-scale range determined in said establishing step.

23. A method as defined in claim 22, further comprising the steps of:

- connecting a display and data-entry unit to said external computer and said re-programmable memory, and
- changing said contents of said one parameter set and said predefined gray-scale segment number through said display and data-entry unit.

24. A method as defined in claim 23, further comprising the step of:

- reading said contents of said one parameter set and said predefined gray-scale segment number from said re-programmable memory via said display and data-entry and indicating said read contents thereon.

* * * * *